(12) United States Patent
Booth et al.

(10) Patent No.: US 7,675,993 B2
(45) Date of Patent: *Mar. 9, 2010

(54) REDUCTION OF AVERAGE-TO-MINIMUM POWER RATIO IN COMMUNICATIONS SIGNALS

(75) Inventors: Richard W. D. Booth, Los Gatos, CA (US); Stephan V. Schell, San Francisco, CA (US); Thomas E. Biedka, Campbell, CA (US); Paul Cheng-Po Liang, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 485 days.

This patent is subject to a terminal disclaimer.

(21) Appl. No.: 11/442,488

(22) Filed: May 26, 2006

(65) Prior Publication Data

US 2006/0227895 A1    Oct. 12, 2006

Related U.S. Application Data

(63) Continuation of application No. 10/037,870, filed on Oct. 22, 2001, now Pat. No. 7,054,385.

(51) Int. Cl.
    H04L 27/00    (2006.01)
(52) U.S. Cl. .................................... 375/295; 375/296
(58) Field of Classification Search ............. 375/295, 375/296

See application file for complete search history.

(56) References Cited

U.S. PATENT DOCUMENTS

| | | | |
|---|---|---|---|
| 4,410,955 A | 10/1983 | Burke et al. | |
| 5,287,387 A | 2/1994 | Birchler | |
| 5,300,894 A | 4/1994 | Myer et al. | |
| 5,302,914 A | 4/1994 | Arntz et al. | |
| 5,349,300 A | 9/1994 | Matz et al. | |
| 5,381,449 A | 1/1995 | Jasper et al. | |
| 5,384,547 A | 1/1995 | Lynk, Jr. et al. | |
| 5,493,587 A | 2/1996 | Sandri et al. | |
| 5,621,762 A | 4/1997 | Miller et al. | |
| 5,696,794 A | 12/1997 | O'Dea | |
| 5,705,959 A | 1/1998 | O'Loughlin | |
| 5,727,026 A | 3/1998 | Beukema | |
| 5,805,640 A * | 9/1998 | O'Dea et al. ................. 375/296 |
| 5,835,536 A | 11/1998 | May et al. | |
| 5,835,816 A | 11/1998 | Sawada et al. | |
| 5,838,724 A | 11/1998 | Cole et al. | |
| 5,930,299 A | 7/1999 | Vannatta et al. | |
| 6,078,628 A | 6/2000 | Griffith et al. | |
| 6,097,252 A | 8/2000 | Sigmon et al. | |

(Continued)

FOREIGN PATENT DOCUMENTS

EP    0 633 680    1/1995

(Continued)

*Primary Examiner*—David C Payne
*Assistant Examiner*—Tanmay K Shah
(74) *Attorney, Agent, or Firm*—McDermott Will & Emery LLP

(57) ABSTRACT

This invention, generally speaking, modifies pulse amplitude modulated signals to reduce the ratio of average power to minimum power. The signal is modified in such a manner that the signal quality remains acceptable. The signal quality is described in terms of the Power Spectral Density (PSD) and the Error Vector Magnitude (EVM).

9 Claims, 22 Drawing Sheets

U.S. PATENT DOCUMENTS

| | | |
|---|---|---|
| 6,104,761 A | 8/2000 | McCallister et al. |
| 6,125,103 A | 9/2000 | Bäuml et al. |
| 6,128,350 A | 10/2000 | Shastri et al. |
| 6,128,351 A | 10/2000 | Jones et al. |
| 6,147,984 A | 11/2000 | McCoy |
| 6,175,551 B1 | 1/2001 | Awater et al. |
| 6,445,747 B1 | 9/2002 | Jafarkhani et al. |
| 6,614,323 B2 | 9/2003 | Wagh et al. |
| 6,687,238 B1 | 2/2004 | Soong et al. |

FOREIGN PATENT DOCUMENTS

| | | |
|---|---|---|
| WO | WO 01/63826 | 8/2001 |

\* cited by examiner

REDUCTION OF AVERAGE-TO-MINIMUM POWER RATIO IN COMMUNICATIONS SIGNALS

CROSS-REFERENCE TO RELATED APPLICATIONS

This is a continuation application of application Ser. No. 10/037,870 filed on Oct. 22, 2001 and issued as U.S. Pat. No. 7,054,385 issued on May 30, 2006.

FIELD OF THE INVENTION

The present invention relates to the reduction of average-to-minimum power ratio in communications signals.

STATE OF THE ART

Many modern digital radio communication systems transmit information by varying both the magnitude and phase of an electromagnetic wave. The process of translating information into the magnitude and phase of the transmitted signal is typically referred to as modulation. Many different modulation techniques are used in communication systems. The choice of modulation technique is typically influenced by the computational complexity needed to generate the signal, the characteristics of the radio channel, and, in mobile radio applications, the need for spectral efficiency, power efficiency and a small form factor. Once a modulation technique has been selected for some specific application, it is oftentimes difficult or essentially impossible to change the modulation. For example, in a cellular radio application all users would be required to exchange their current mobile phone for a new phone designed to work with the new modulation technique. Clearly this is not practical.

Many existing modulation formats have been designed to be transmitted with radios that process the signal in rectangular coordinates. The two components in the rectangular coordinate system are often referred to as the in-phase and quadrature (I and Q) components. Such a transmitter is often referred to as a quadrature modulator. (A distinction is drawn between a modulation, which is a mathematical description of the method used to translate the information into the transmitted radio signal (e.g., BPSK, FSK, GMSK), and a modulator, which is the physical device used to perform this operation.) As an alternative, the transmitter may process the signal in polar coordinates, in which case the signal is represented in terms of its magnitude and phase. In this case the transmitter is said to employ a polar modulator. A polar modulator can have several performance advantages over the more conventional quadrature modulator, including higher signal fidelity, better spectral purity, and lower dependence of device performance on temperature variation.

Although a polar modulator can have practical advantages over a quadrature modulator, the magnitude and phase components of the signal typically have much higher bandwidth than the in-phase and quadrature components. This bandwidth expansion has implications for digital processing of the magnitude and phase, since the rate at which the magnitude and phase must be processed is dependent on their bandwidth.

The rate at which the magnitude and phase varies is very much dependent on the modulation technique. In particular, modulation formats that lead to very small magnitude values (relative to the average magnitude value) generally have very large phase component bandwidth. In fact, if the signal magnitude goes to zero, the signal phase can instantaneously change by up to 180 degrees. In this case the bandwidth of the phase component is essentially infinite, and the signal is not amenable to transmission by a polar modulator.

Many commonly employed modulation techniques do in fact lead to very small relative signal magnitude. To be more precise, the average-to-minimum signal magnitude ratio (AMR) is large. An important practical example of a modulation technique with large AMR is the technique employed in the UMTS 3GPP uplink (mobile-to-basestation).

Prior work in the field may be classified into two categories: one that deals generally with the reduction of peak power, and another that deals specifically with "hole-blowing." Hole-blowing refers to the process of removing low-power events in a communication signal that has a time-varying envelope. This name arises in that, using this technique, a "hole" appears in the vector diagram of a modified signal.

Much work has been done dealing with peak power reduction, in which the goal is to locally reduce signal power. By contrast, relatively little work appears to have been done that deals with hole-blowing (which seeks to locally increase signal power), and prior approaches have been found to result in less-than-desired performance.

U.S. Pat. No. 5,805,640 (the '640 patent) entitled "Method and apparatus for conditioning modulated signal for digital communications," together with U.S. Pat. No. 5,696,794 (the '794 patent), entitled "Method and apparatus for conditioning digitally modulated signals using channel symbol adjustment," both describe approaches for removing low magnitude (low power) events in communication signals. Both patents in fact refer to creating "holes" in the signal constellation. The motivation given for creating these holes is that certain power amplifiers, in particular LINC power amplifiers, are difficult to implement when the signal amplitude dynamic range is large.

Briefly, the '794 patent teaches modifying the magnitude and phase of the symbols to be transmitted in order to maintain some minimum power. Since the symbols are modified before pulse shaping, the modified signal has the same spectral properties as the original signal. The approach used in the '640 patent is to add a pulse having a certain magnitude and phase in between the original digital symbols before pulse shaping. Hence, whereas in the former patent data is processed at the symbol rate (T=1), in the latter patent, data is processed at twice the symbol rate (T=2). For brevity, these two methods will be referred to as the symbol rate method and the T/2 method, respectively. The method used to calculate the magnitude and phase of the corrective pulse(s) is nearly identical in both patents.

Because the method used by both of these patents to calculate the corrective magnitude and phase is only a very rough approximation, performance is less than desired. More particularly, after processing the signal using either of these two approaches, the probability of a low power event is reduced, but remains significantly higher than desired.

The specific approach used in the T/2 method is to add a pulse having a prescribed magnitude and phase to the signal at half-symbol timing (i.e., at t=k*T+T/2) before pulse shaping. The magnitude and phase of the additive pulse is designed to keep the signal magnitude from dropping below some desired threshold. The method does not allow for placement of pulses at arbitrary timing. As a result, effectiveness is decreased, and EVM (error vector magnitude) suffers.

The method used in the T/2 approach to calculate the magnitude and phase of the additive pulse is very restrictive in that:

1) The signal envelope is only tested for a minimum value at half-symbol timing (t=i*T+T/2).

2) The phase of the correction is not based on the signal envelope, but rather only on the two symbols adjoining the low-magnitude event.

These two restrictions can lead to errors in the magnitude and phase of the corrective pulses. Specifically, the true signal minimum may occur not at T/2, but at some slightly different time, so that error will be introduced into the magnitude of the corrective pulses. The validity of this assumption is very much dependent on the specific signal modulation and pulse-shape. For example, this may be a reasonable assumption for a Universal Mobile Telecommunication System (UMTS) uplink signal with one Dedicated Physical Data Channel (DP-DCH), but is not a reasonable assumption for a UMTS uplink signal with two DPDCH active. The size of this magnitude error can be quite large. For example, in some cases the magnitude at T/2 is very near the desired minimum magnitude, but the true minimum is very close to zero. In such cases the calculated correction magnitude is much smaller than would be desired, which in turn results in the low-magnitude event not being removed.

The signal envelope at T/2 may be greater than the desired minimum, but the signal magnitude may be below the threshold during this inter-symbol time interval, so that a low-magnitude event may be missed entirely.

In any event, the correction magnitude obtained is often far from what is needed.

The method used to calculate the corrective phase essentially assumes that the phase of the pulse shaped waveform at T/2 will be very close to the phase of straight line drawn between the adjoining symbols. This is an approximation in any case (although generally a reasonable one), which will introduce some error in the phase. However, this approximation is only valid if the origin does not lie between the previously described straight line and the true signal envelope. When this assumption is violated, the corrective phase will be shifted by approximately 180 degrees from the appropriate value. This typically leaves a low-magnitude event that is not corrected.

While the T/2 method adds pulses at half-symbol timing, the symbol rate method adds pulses to the two symbols that adjoin a low-magnitude event. That is, if the signal has a low-magnitude event at t=kT+T/2, then symbols k and (k+1) will be modified. Both methods calculate the phase of the additive pulses the same way, and both methods test for a low-magnitude event in the same way, i.e., the signal envelope at half-symbol timing is tested. Therefore the same sources of magnitude error and phase error previously noted apply equally to this method.

The T/2 method applies the correction process repeatedly in an iterative fashion. That is, this method is applied iteratively "until there are no symbol interval minima less than the minimum threshold".

As compared to the foregoing methods, U.S. Pat. No. 5,727,026, "Method and apparatus for peak suppression using complex scaling values," addresses a distinctly different problem, namely reducing the Peak-to-Average power Ratio (PAR) of a communication signal. Large PAR is a problem for many, if not most, conventional power amplifiers (PA). A signal with a large PAR requires highly linear amplification, which in turn affects the power efficiency of the PA. Reduction is accomplished by adding a pulse to the original pulse-shaped waveform, with the pulse having an appropriate magnitude and phase such that the peak power is reduced. The pulse can be designed to have any desired spectral characteristics, so that the distortion can be kept in-band (to optimize the Adjacent Channel Power Ratio (ACPR)), or allowed to leak somewhat out-of-band (to optimize the error vector magnitude (EVM)). The timing of the added pulse is dependent on the timing of the peak power, and is not constrained to lie at certain timing instants.

More particularly, this peak-reduction method adds a low-bandwidth pulse to the original (high PAR) signal. The added pulse is 180 degrees out of phase with the signal at the peak magnitude, and the magnitude of the additive pulse is the difference between the desired peak value and the actual peak value. Because the pulse is added to the signal (a linear operation) the spectral properties of the additive pulse completely determine the effect of the peak reduction technique on the signal spectrum. The possibility is addressed of a peak value occurring at some time that does not correspond to a sampling instant. The method emphasizes the ability to control the amount of signal splatter and/or signal distortion.

U.S. Pat. No. 6,175,551 also describes a method of PAR reduction, particularly for OFDM and multi-code CDMA signals where "a time-shifted and scaled reference function is subtracted from a sampled signal interval or symbol, such that each subtracted reference function reduces the peak power". The reference function is a windowed sinc function in the preferred embodiment, or some other function that has "approximately the same bandwidth as the transmitted signal".

Other patents of interest include U.S. Pat. Nos. 5,287,387; 5,727,026; 5,930,299; 5,621,762; 5,381,449; 6,104,761; 6,147,984; 6,128,351; 6,128,350; 6,125,103; 6,097,252; 5,838,724; 5,835,536; 5,835,816; 5,838,724; 5,493,587; 5,384,547; 5,349,300; 5,302,914; 5,300,894; and 4,410,955.

What is needed, and is not believed to be found in the prior art, is a process whereby the AMR of a communication signal can be greatly reduced without causing significant degradation to the signal quality. Desirably, this process would allow the practical implementation of a polar modulator even for signals that have very high AMR.

SUMMARY OF THE INVENTION his invention, generally speaking, modifies pulse amplitude modulated signals to reduce the ratio of average power to minimum power. The signal is modified in such a manner that the signal quality remains acceptable. The signal quality is described in terms of the Power Spectral Density (PSD) and the Error Vector Magnitude (EVM).

BRIEF DESCRIPTION OF THE DRAWING

The present invention may be further understood from the following description in conjunction with the appended drawings. In the drawings:

FIG. 2b is a more detailed block diagram of an apparatus like that of FIG. 2a;

FIG. 17b is a more detailed block diagram of an apparatus like that of FIG. 17a;

DETAILED DESCRIPTION OF THE PREFERRED EMBODIMENTS

Figure 1:
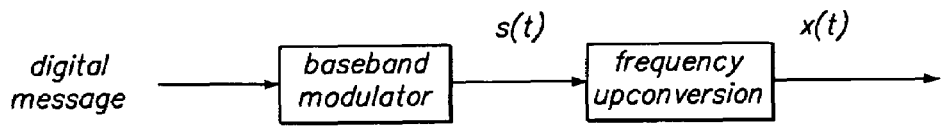
FIG. 1 is a generic block diagram for generation of a PAM signal.

A polar modulator can be viewed as a combination of a phase modulator and an amplitude modulator. The demands placed on the phase modulator and amplitude modulator are directly dependent on the bandwidth of the signal's phase and magnitude components, respectively. The magnitude and phase bandwidth, in turn, are dependent on the average-to-minimum magnitude ratio (AMR) of the signal. As will be shown later, a signal with large AMR can have very abrupt changes in phase, which means that the signal phase component has significant high frequency content. Furthermore, certain transistor technologies limit the AMR that can be achieved in a practical amplitude modulator. This limitation can lead to distortion of the transmitted signal if the required magnitude dynamic range exceeds that which can be generated by the transistor circuit. Thus minimization of signal AMR is highly desirable if the signal is to be transmitted with a polar modulator. One example of a polar modulator is described in U.S. patent application Ser. No. 10/045,199) entitled "Multi-mode communications transmitter," filed on even date herewith and incorporated herein by reference.

The non-linear digital signal processing techniques described herein modify the magnitude and phase of a communication signal in order to ease the implementation of a polar modulator. Specifically, the magnitude of the modified signal is constrained to fall within a certain desired range of values. This constraint results in lower AMR compared to the original signal, which in turn reduces the magnitude and phase bandwidth. The cost of this reduction in bandwidth is lower signal quality. However, the reduction in signal quality is generally small, such that the final signal quality is more than adequate.

Signal quality requirements can typically be divided into in-band and out-of-band requirements. Specifications that deal with in-band signal quality generally ensure that an intended receiver will be able to extract the message sent by the transmitter, whether that message be voice, video, or data. Specifications that deal with out-of-band signal quality generally ensure that the transmitter does not interfere excessively with receivers other than the intended receivers.

The conventional in-band quality measure is the RMS error vector magnitude (EVM). A mathematically related measure is rho, which is the normalized cross-correlation coefficient between the transmitted signal and its ideal version. The EVM and rho relate to the ease with which an intended receiver can extract the message from the transmitted signal. As EVM increases above zero, or rho decreases below one, the transmitted signal is increasingly distorted relative to the ideal signal. This distortion increases the likelihood that the receiver will make errors while extracting the message.

The conventional out-of-band quality measure is the power spectral density (PSD) of the transmitted signal, or some measure derived therefrom such as ACLR, ACP, etc. Of particular interest in relation to PSD is the degree to which the transmitted signal interferes with other radio channels. In a wireless communications network, interference with other radio channels reduces the overall capacity of the network (e.g., the number of simultaneous users is reduced).

It should be clear that any means of reducing the average-to-minimum magnitude ratio (AMR) must create as little interference as possible (minimal degradation to out-of-band signal quality) while simultaneously maintaining the in-band measure of signal quality (i.e., EVM or rho) at an acceptable level. These considerations motivate the present invention, which reduces AMR while preserving out-of-band signal quality, which is of particular importance to operators of wireless communications networks.

In general, AMR reduction is performed by analyzing the signal to be transmitted, and adding carefully formed pulses into the signal in time intervals in which the signal magnitude is smaller than some threshold. The details of an exemplary embodiment, including the signal analysis and pulse formation, are described below, starting with a description of a class of signals for which the invention is useful.

Pulse-Amplitude Modulation (PAM)

Many modern communication systems transmit digital messages using a scheme called pulse amplitude modulation (PAM). A PAM signal is merely a frequency-upconverted sum of amplitude-scaled, phase-shifted, and time-shifted versions of a single pulse. The amplitude-scaling and phase-shifting of the $n^{th}$ time-shifted version of the pulse are determined by the $n^{th}$ component of the digital message. In the field of communication systems, the broad class of PAM signals includes signals commonly referred to as PAM, QAM, and PSK, and many variants thereof. Mathematically, a PAM signal x(t) at time t can be described as follows, as will be recognized by those skilled in the art of communications theory. The description is given in two parts, namely the frequency-upconversion and amplification process, and the baseband modulation process, as shown in FIG. 1.

The frequency-upconversion and amplification process can be described mathematically as follows:

$$x(t) = Re\{gs(t)e^{j\omega_c t}\}$$

where Re{ } denotes the real part of its complex argument, $\omega_c = 2\pi f_c$ defines the radio carrier frequency in radians per second and Hz, respectively, j is the imaginary square-root of negative unity, and g is the amplifier gain. This equation describes the frequency-upconversion process used to frequency-upconvert and amplify the complex baseband signal s(t), which is also the so-called I/Q (in-phase/quadrature) representation of the signal. The signal s(t), which is created by the baseband modulation process, is defined mathematically by $$s(t) = \sum_n a_n p(t - nT)$$

where p(t) is the pulse at time t and T is the symbol period (1/T is the symbol rate). For any time instant t at which s(t) is desired, the summation is taken over all values of n at which p(t−nT) is non-negligible. Also, $a_n$ is the symbol corresponding to the $n^{th}$ component of the digital message. The symbol $a_n$ can be either real or complex, and can be obtained from the $n^{th}$ component of the digital message by means of either a fixed mapping or a time-variant mapping. An example of a fixed mapping occurs for QPSK signals, in which the $n^{th}$ component of the digital message is an integer $d_n$ in the set {0,1,2,3}, and the mapping is given by $a_n = \exp(j\pi d_n/2)$. An example of a time-variant mapping occurs for π/4-shifted QPSK, which uses a modified QPSK mapping given by $a_n = \exp(j\pi(n+2d_n)/4)$; that is, the mapping depends on the time-index n, not only on the message value $d_n$.

For the present invention, an important property of PAM signals is that the shape of the PSD (as a function of $f$) of a PAM signal is determined exclusively by the pulse p(t), under the assumption that the symbol sequence $a_n$ has the same second-order statistical properties as white noise. This property may be appreciated by considering the signal s(t) as the output of a filter having impulse response p(t) and being driven by a sequence of impulses with weights $a_n$. That is, the PSD $S_x(f)$ of x(t) can be shown to be equal to $$S_x(f) = \frac{g^2 \sigma_a^2}{4T}(|P(f - f_c)|^2 + |P(f + f_c)|^2)$$

where P($f$) is the Fourier transform of the pulse p(t), and $\sigma_a^2$ is the mean-square value of the symbol sequence.

This important observation motivates the present method, because it suggests that adding extra copies of the pulse into s(t) does not alter the shape of the PSD. That is, nonlinear filtering performed in this manner can result in not just minor but in fact imperceptible changes in PSD. The adding of extra copies of the pulse into the signal can be used to increase the amplitude of x(t) as desired, for example when it falls below some threshold. Specifically, s(t) may be modified by adding additional pulses to it, to form new signals ŝ(t) and x̂(t):

$$\hat{x}(t) = Re\{g\hat{s}(t)e^{j\omega_c t}\}$$

where $$\hat{s}(t) = \sum_n a_n p(t - nT) + \sum_m b_m p(t - t_m),$$

and the perturbation instances $t_m$ occur at points in time when it is desired to perturb the signal (e.g., whenever the magnitude of s(t) falls below some threshold). The perturbation sequence $b_m$ represents the amplitude-scaling and phase-shifting to be applied to the pulse centered at time $t_m$ (e.g., chosen so as to increase the magnitude of s(t) in the vicinity of time $t_m$). Like the first term in ŝ(t), the second term in ŝ(t) can be thought of as the output of a filter having impulse response p(t) and being driven by a sequence of impulses with weights $b_m$. Thus, it is reasonable to expect that the PSDs of x̂(t) and x(t) will have very similar shapes (as a function of frequency $f$).

Figure 2A:
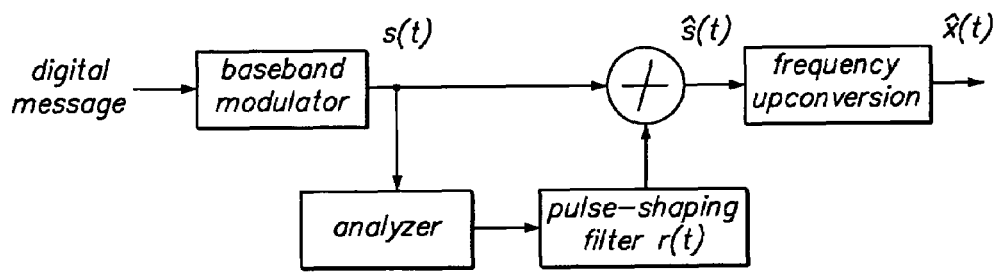
FIG. 2a is a block diagram of a PAM generator modified for AMR reduction.

With this theoretical underpinning, the present invention can be described in detail, in a slightly more general form than used above, as depicted in FIG. 2a. The invention takes the signal s(t) as its input. This signal passes into an analyzer, which determines appropriate perturbation instances $t_m$, and outputs a perturbation sequence value $b_m$ at time instant $t_m$. The perturbation sequence passes through a pulse-shaping filter with impulse response r(t), the output of which is added to s(t) to produce ŝ(t), which in turn is passed to any appropriate means for frequency upconversion and amplification to the desired power. The pulse-shaping filter r(t) can be identical to the original pulse p(t), as described above, or it can be different from p(t) (e.g., it may be a truncated version of p(t) to simplify implementation).

Figure 2B:
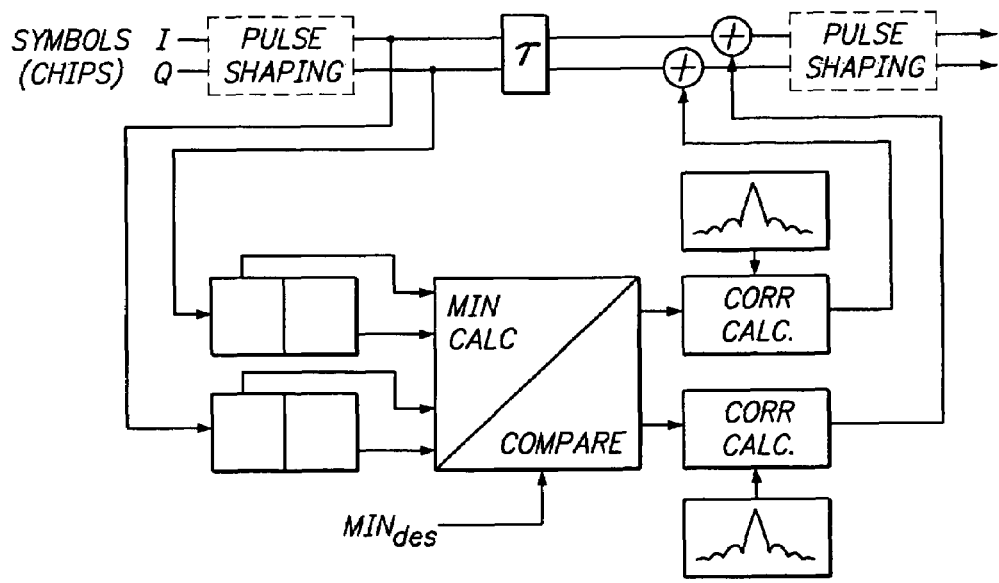

A more detailed block diagram is shown in FIG. 2b, illustrating a main signal path and a correction signal path for two signal channels, I and Q. Pulse-shaping may occur after pulse-shaping (sample-rate correction) or prior to pulse-shaping (symbol-rate correction). In the correction path, sequential values of I and Q are used to perform a signal minimum calculation and comparison with a desired minimum. If correction is required based on the comparison results, then for each channel the magnitude of the required correction is calculated. A pulse (which may be the same as that used for pulse-shaping) is scaled according to the required correction and added into the channel of the main path, which will have been delayed to allow time for the correction operations to be performed.

The method used to determine the timing, magnitude, and phase of the correction pulses is dependent on the modulation format. Factors to consider include:

1. The duration of low-magnitude events relative to the symbol period.
2. The timing distribution of low-magnitude events.

If the duration of all low-magnitude events are small relative to the symbol (or chip) duration, then each low-magnitude event can be corrected by the addition of a single complex-weighted pulse, which can be identical to that used in pulse-shaping. This approach would be effective with, e.g., M-ary PSK modulation. The appropriate hole-blowing method in this case is referred to as the "exact" hole-blowing method. The exact hole-blowing method is described below, as well as a practical real-time hardware implementation of the same. Other modulation formats may lead to low-magnitude events of relatively long duration. This would typically be the case with, e.g., QAM and multi-code CDMA modulation. In such cases multiple pulses may be added, or, alternatively, multiple iterations of the exact hole-blowing method be used. The usefulness of polar-domain hole-blowing has been demonstrated to perform "final clean-up" of a signal produced using one of the foregoing techniques, achieving even better EVM performance. Because magnitude information is available explicitly in the polar-domain representation, hole-blowing may be performed on a sample-by-sample basis, as compared to (typically) a symbol-by-symbol (or chip) basis in the case of the foregoing techniques.

The Exact Hole-Blowing Method

Figure 3:
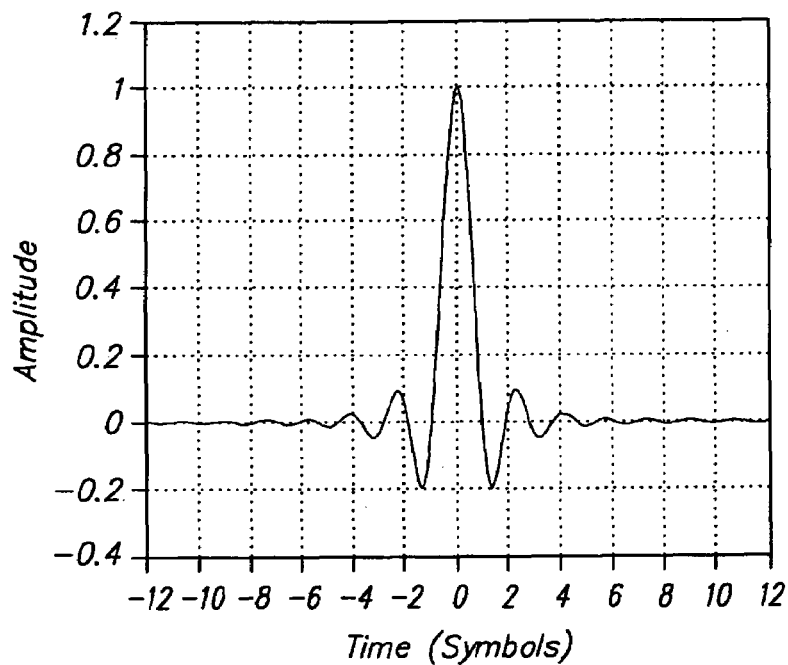
FIG. 3 shows the impulse response of a square-root raised-cosine pulse shaping filter with 22% excess bandwidth.
Figure 4:
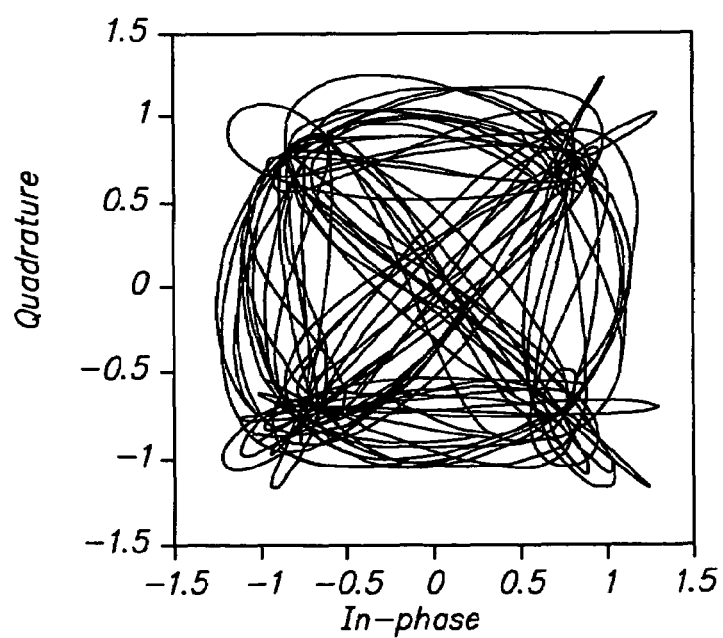
FIG. 4 shows an I-Q plot (vector diagram) of a portion of a QPSK signal with square-root raised-cosine pulse shaping.
Figure 5:
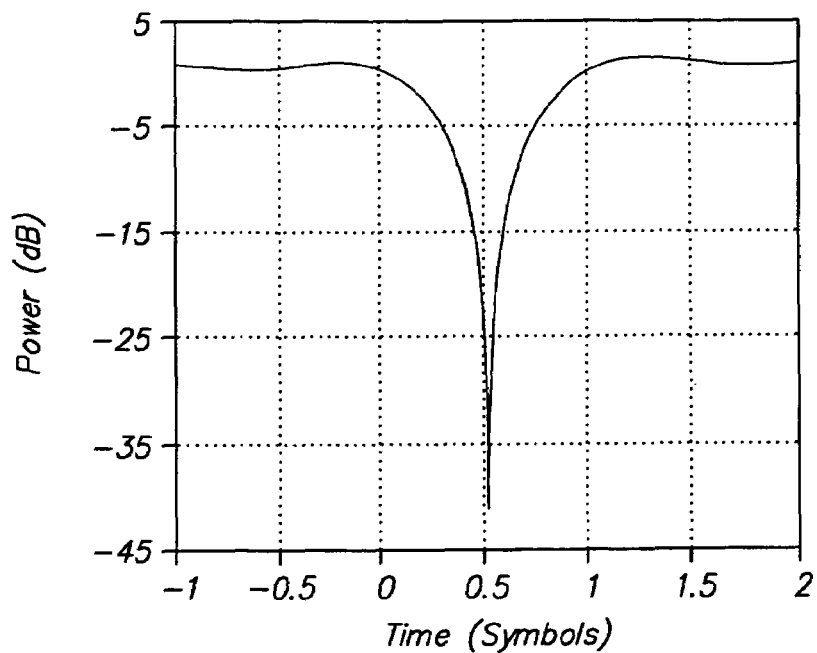
FIG. 5 shows a section of the power of the pulse-shaped QPSK signal as a function of time.

The detailed operation of the exact hole-blowing method is now demonstrated by example. A QPSK signal with square-root raised-cosine pulse shaping is used for this example. The pulse shaping filter has 22% excess bandwidth, and is shown in FIG. 3. A typical I/Q plot of this signal is presented in FIG. 4. Clearly the signal magnitude can become arbitrarily small. The signal power over a short period of time is shown in FIG. 5. The average power is normalized to unity (0 dB). This figure indicates that the AMR of this signal is at least 40 dB. In reality, the AMR for this QPSK signal is effectively infinite, since the signal power can become arbitrarily small. The timing of the minimum power is important, since the time instants at which to insert the correction pulses must be determined. One would expect that the power minima would approximately occur at t=nT/2, where n is an integer and T is the symbol period. This is supported by FIG. 5, which shows that the minimum power occurs very near T/2.

To further support this hypothesis, the distribution of the power minima timing was examined. For this purpose, a pulse-shaped QPSK waveform with random message was generated, and the timing at which the power minima occurred was determined. For this example, it is assumed that a low power event occurs if the instantaneous signal power was more than 12 dB below the mean signal power.

Figure 6:
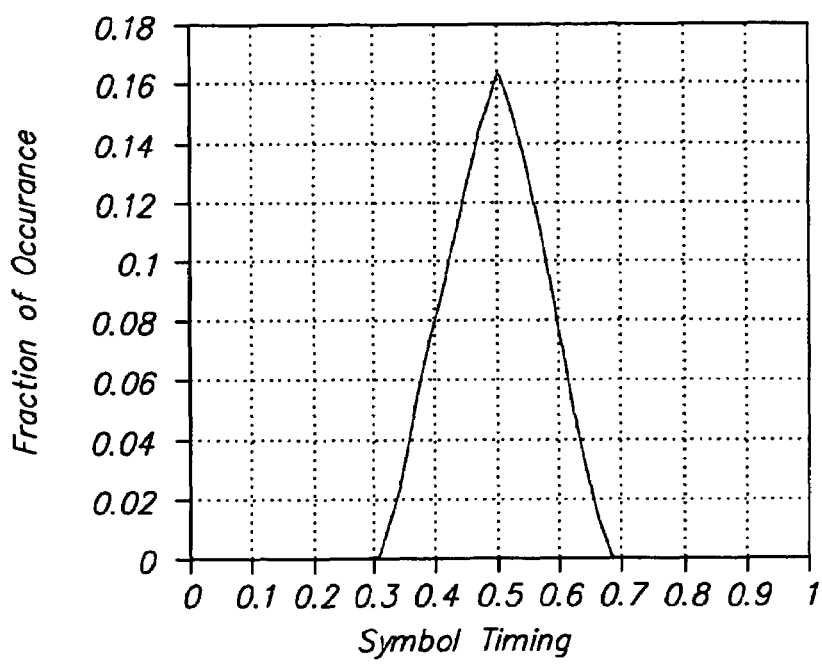
FIG. 6 is a histogram showing the temporal location of signal magnitude minima, including only those minima that are more than 12 dB below the mean power.

FIG. 6 shows a histogram of the timing of the QPSK signal magnitude minima. These results are based on 16384 independent identically distributed symbols. Note that the minima are indeed closely clustered around a symbol timing of T/2, as expected. This is an important result, since it limits the range over which the search for a signal minimum must be performed. (It should be noted that the histogram shown in FIG. 6 is only valid for this specific signal type (QPSK). Other signal types, such as high order QAM, may have different distributions, which must be taken into account in the search for local power-minima.)

Figure 7:
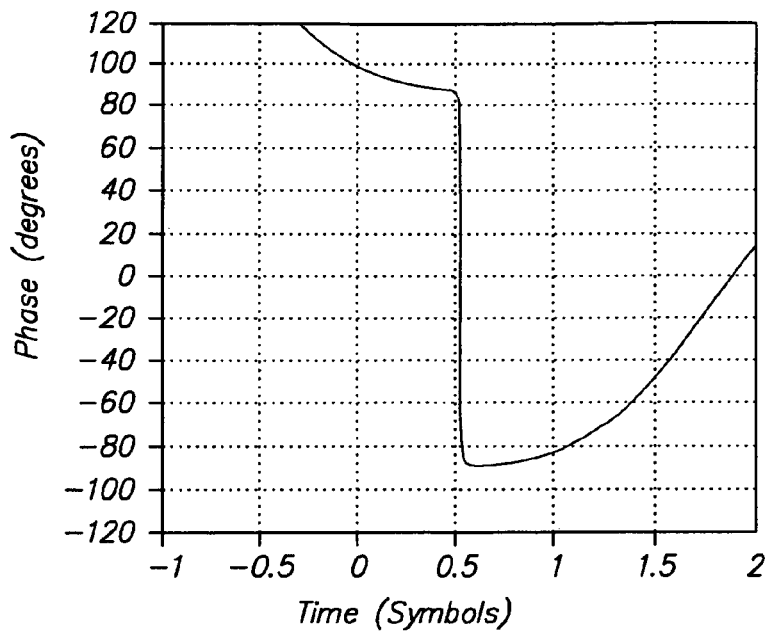
FIG. 7 shows phase of the QPSK signal as a function of time.
Figure 8:
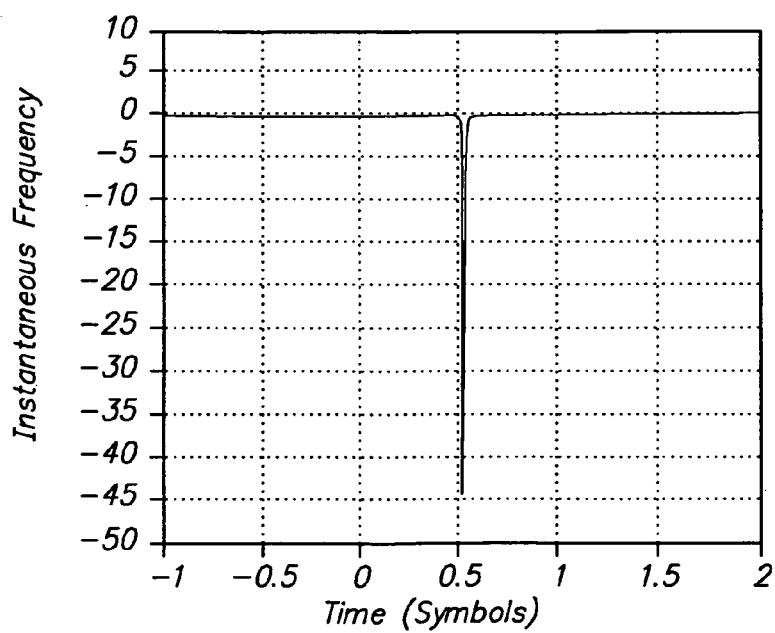
FIG. 8 shows instantaneous frequency expressed as a multiple of the symbol rate for the signal of FIG. 7.

As stated previously, low-power events are associated with rapid changes in the signal phase. This correspondence is illustrated in FIG. 7, which shows the phase of the QPSK signal corresponding to the power profile shown in FIG. 5. It is clear that the phase changes rapidly near t=T/2, corresponding to the minimum power. This characteristic can be seen more explicitly in FIG. 8, which shows the instantaneous frequency, defined here for the sampled data waveform as $$f_i(t) = \frac{\theta(t+\delta) - \theta(t)}{2\pi\delta}$$

where θ(t) is the signal phase at time instant t and δ is the sampling period. FIG. 8 shows that the instantaneous frequency over this interval is up to 45 times the symbol rate. To put this in perspective, the chip rate for the UMTS 3GPP wideband CDMA standard is 3.84 MHz. If the symbol rate for the QPSK signal in our example was 3.84 MHz, the instantaneous frequency would exceed 45×3.84 172.8 MHz. Processing a signal with such high instantaneous frequency is not yet practical.

It is apparent that the bandwidth of the signal phase must be reduced in order to enable practical implementation of a polar modulator. The most obvious approach is to simply low-pass filter the phase (or equivalently the phase difference). However, any substantial filtering of the phase-difference will lead to unacceptably large non-linear distortion of the signal. This distortion in turn leads to a large increase in out-of-band signal energy, which is typically not acceptable. Instead the recognition is made that rapid changes in signal phase only occur when the signal magnitude is very small. Therefore if the signal magnitude can be kept above some minimum value, the bandwidth of the signal phase will be reduced. As should be evident from the discussion of PAM signal spectral properties, the signal can be modified by the addition of carefully selected pulses without any apparent effect on the signal bandwidth.

In order to avoid low-magnitude events, and consequently reduce the instantaneous frequency, a complex weighted version of the pulse-shaping filter is added to the signal. This complex weighted pulse is referred to as the correction pulse. The phase of the pulse is selected so that it combines coherently with the signal at the point of minimum magnitude. The magnitude of the correction pulse is equal to the difference between the desired minimum magnitude and the actual minimum magnitude of the signal.

Care must be taken in the calculation of the correction magnitude and phase in order to obtain the desired effect. Most importantly, it must be recognized that the minimum signal magnitude may not correspond to a sampling instant. Since the phase and magnitude are changing rapidly in the neighborhood of a local power minimum, choosing the correction phase based on a signal value that does not correspond to the signal minimum can lead to large phase and/or magnitude error. The likelihood of a large error increases as the minimum magnitude grows smaller. The likelihood of a large error can be lessened by using a very high sampling rate (i.e., a large number of samples per symbol), but this greatly, and unnecessarily, increases the computational load.

Instead, a so-called "locally linear model" is fitted to the signal in the temporal neighborhood of a local power minimum, and the minimum magnitude of the model is solved for mathematically. The locally linear model effectively interpolates the signal so that the magnitude can be calculated directly at any arbitrary time instant. In this way the calculation of the corrective pulses are not limited to the values present in the sampled data waveform. This allows for highly accurate calculation of the minimum magnitude and, of equal importance, the required correction phase.

Note that the complete pulse-shaped signal need not exist in order to calculate the correction magnitude and phase. The complex baseband signal need only be calculated at a small number of key sampling instants, allowing the non-linear filtering to operate on the raw symbols before a final pulse-shaping step. This expedient can be beneficial in real-time implementations.

Figure 9A:
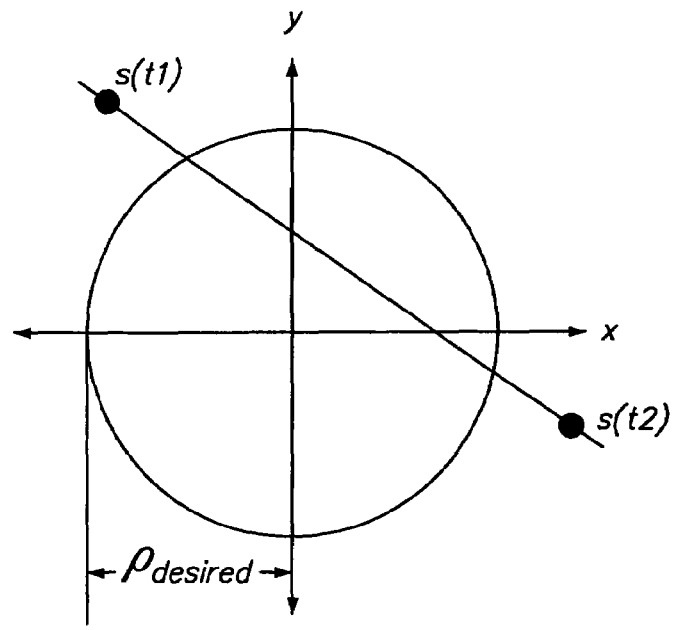
FIG. 9a illustrates a situation in which a mathematical model may be used to detect the occurrence of a low magnitude event.
Figure 9B:
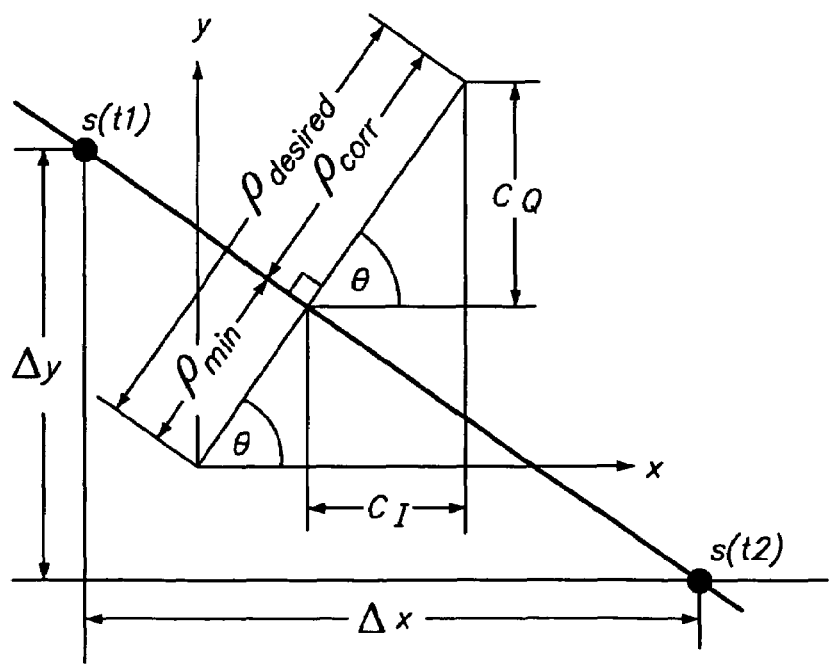
FIG. 9b is a geometric illustration of the locally linear model for the complex signal envelope.

A signal may lie outside the exclusion region defined by the desired minimum at two points fairly near in time, yet pass through the exclusion region in between the two points, as illustrated in FIG. 9a. In order to find the true minimum value of the signal magnitude, and its corresponding phase, the following approach is preferably used. This approach employs a locally linear model for the complex baseband signal envelope, as illustrated in FIG. 9b. The model approximates the complex signal envelope by a straight line in I/Q space in the vicinity of the local power minimum. In many cases, if the desired minimum power is small, and the signal modulation is not too complicated (e.g., PSK), this model is quite accurate. Once this model has been fitted to the signal, the minimum magnitude of the locally linear model can be solved for directly.

In order to formulate the model, the complex signal must be known at no less than two distinct time instants. These time instants will preferably be close to the true minimum value of the signal, since the accuracy of the model is better in this case. These time instants need not correspond to sampling instants that are present in the sampled signal envelope.

Denote the complex signal at time t1 by s(t1). Denote the real and imaginary parts of s(t1) by x1 and y1, respectively. Similarly, denote the real and imaginary parts of s(t2) by x2 and y2, respectively. The signal at these time instants are given by:

$$s(t1) = \sum_i a_i p(t1 - iT)$$

$$s(t2) = \sum_i a_i p(t2 - iT)$$

where t2>t1, and t2−t2<<T. Then define $$\Delta x = x2 - x1$$

$$\Delta y = y2 - y1$$

To the degree that the locally linear model is accurate, the complex signal at any instant in time t can be represented as $$s(t) = s(t1) + c\Delta x + jc\Delta y$$

$$Re\{s(t)\} = x1 + c\Delta x$$

$$Im\{s(t)\} = y1 + c\Delta y$$

where c is a slope parameter.

In order to find the minimum magnitude of this linear model, a geometric approach based on FIG. 9b is used. The point of minimum magnitude corresponds to a point on the locally linear model that intersects a second line which passes through the origin and is orthogonal to the linear model, as illustrated in FIG. 9b. This orthogonal line can be described parametrically (using the parameter g) by the equations:

$$x = -g\Delta y$$

$$y = g\Delta x$$

The point of intersection is found by setting the x-axis and y-axis components of the linear model and the orthogonal line equal. This yields the following set of equations (two equations and two unknowns):

$$x1 + c\Delta x = -g\Delta y$$

$$y1 + c\Delta y = g\Delta x$$

Re-arranging these equations gives:

$$c = \frac{-(g\Delta y + x1)}{\Delta x}$$

$$c = \frac{(g\Delta x - y1)}{\Delta y}$$

Setting these two expressions equal, and solving for g, gives:

$$g = \frac{(y1\Delta x - x1\Delta y)}{\Delta x^2 + \Delta y^2}$$

The minimum magnitude of the linear model is then $$\rho_{min}^2 = (g\Delta x)^2 + (g\Delta y)^2$$

$$\rho_{min} = |g|\sqrt{\Delta x^2 + \Delta y^2}$$

$$= \frac{|y1\Delta x - x1\Delta y|}{\sqrt{\Delta x^2 + \Delta y^2}}$$

The minimum magnitude as calculated from the locally linear model must be explicitly calculated in order to test for a low-magnitude event and to calculate the correction magnitude. The minimum magnitude is also used to calculate the magnitude of the correction pulse, which is given by:

$$\rho_{corr} = \rho_{desired} - \rho_{min}$$

Figure 9C:
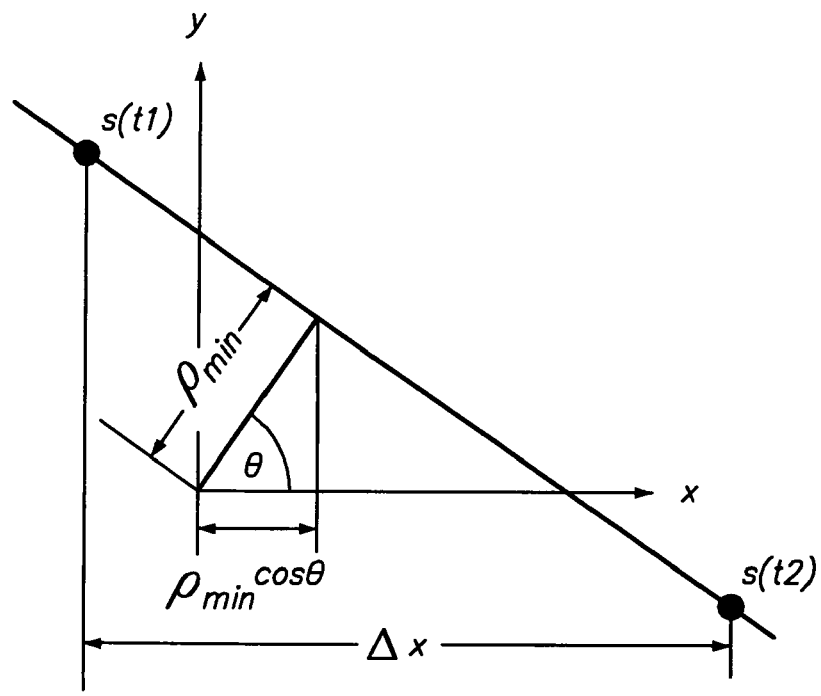
FIG. 9c illustrates calculation of t_min based on the locally linear model.

The correction phase is equal to the phase of the signal at minimum magnitude, as determined from the locally linear model. If the corrections are being performed in the I/Q domain, there is no need to explicitly calculate the phase $\theta$ of the correction—only $\sin(\theta)$ and $\cos(\theta)$ need be calculated. Referring to FIG. 9$b$, it may be seen that:

$$\rho_{min}\cos\theta = -g\Delta y$$

$$\cos\theta = \frac{-g\Delta y}{\rho_{min}}$$

$$= \frac{-\Delta y(y1\Delta x - x1\Delta y)\sqrt{\Delta x^2 + \Delta y^2}}{|y1\Delta x - x1\Delta y|(\Delta x^2 + \Delta y^2)}$$

$$= \frac{-\Delta y \, \text{sign}(y1\Delta x - x1\Delta y)}{\sqrt{\Delta x^2 + \Delta y^2}}$$

where c/|c|=sign(c) for any scalar c. Similarly:

$$\sin\theta = \frac{\Delta x \, \text{sign}(y1\Delta x - x1\Delta y)}{\sqrt{\Delta x^2 + \Delta y^2}}$$

In rectangular coordinates, the in-phase and quadrature correction factors will respectively have the form:

$$c_I = (\rho_{desired} - \rho_{min})\cos\theta$$

$$c_Q = (\rho_{desired} - \rho_{min})\sin\theta$$

Thus, it is seen that $\cos\theta$ and $\sin\theta$ are sufficient in order to calculate the correction factors, and the independent determination of signal phase $\theta$ is not necessary. The modified signal in rectangular coordinates is given by:

$$\hat{s}_I(t) = s_I(t) + c_I p(t - t_{min})$$

$$\hat{s}_Q(t) = s_Q(t) + c_Q p(t - t_{min})$$

where t_min is the approximate time at which the local minimum occurs, and the pulse is assumed (without loss of generality) to be normalized such that p(0)=1.

In some applications it may be desirable to obtain a precise estimate of the time t_min corresponding to the minimum signal power. Here, "precise" is used to mean an estimate that is not limited by the sample rate, and may have an arbitrary degree of accuracy. For example, given t_min, correction pulses may be added to the signal based on an interpolated or highly oversampled prototype pulse p(t). For this purpose, any of the three following procedures that exploit the locally linear model can be used. The first two approaches are based on geometric arguments. The third approach is based on direct minimization of the signal magnitude.

Linear interpolation is typically employed to estimate a signal value at some arbitrary time t when the signal is only known at two or more discrete time indices. That is, linear interpolation is used to find s(t) given t. However, linear interpolation can also be used to find t given s(t). This property may be exploited as follows, in accordance with the illustration of FIG. 9$c$. The linear model is $$s(t) = s(t1) + c(\Delta x + j\Delta y)$$

where $$c = \frac{t - t1}{t2 - t1}$$

For the real part of the signal, $$x = x_1 + \frac{t - t_1}{t_2 - t_1}(x_2 - x_1)$$

Solving this expression for t, $$t = t_1 + \frac{x - x_1}{x_2 - x_1}(t_2 - t_1)$$

The calculation of t_min depends on the calculation of x_min, the real part of the signal at the local minimum magnitude. As described previously, the minimum magnitude of the signal is $\rho_{min}$; the real part of the signal at minimum magnitude is $\rho_{min} \cos\theta$. Therefore $$t_{min} = t_1 + \left(\frac{\rho_{min}\cos\theta - x_1}{x_2 - x_1}\right)(t_2 - t_1)$$

Based on similar arguments for the imaginary part of the signal, alternatively $$t_{min} = t_1 + \left(\frac{\rho_{min}\sin\theta - y_1}{y_2 - y_1}\right)(t_2 - t_1)$$

The two expressions described above only depend on the real part or imaginary part of the signal. In a finite precision implementation, this may be a drawback if the change in x or y is small. Therefore it may be better in practice to use an expression which is dependent on both the real and imaginary parts of the signal. Such an expression can be derived by direct minimization of the signal magnitude using standard optimization procedures. Using the linear model, the signal magnitude is $$|s(t)|^2 = (x_1 + c\Delta x)^2 + (y_1 + c\Delta y)^2$$

Taking the derivative with respect to c, $$\frac{\partial}{\partial c}|s(t)|^2 = 2(x_1 + c\Delta_x)\Delta_x + 2(y_1 + c\Delta_y)\Delta_y$$

Setting the derivative equal to zero and solving for c, $$c_{min} = \frac{-(x_1\Delta_x + y_1\Delta_y)}{\Delta_x^2 + \Delta_y^2}$$

Thus the final expression for t_min is $$t_{min} = t_1 + \left(\frac{-(x_1\Delta_x + y_1\Delta_y)}{\Delta_x^2 + \Delta_y^2}\right)(t_2 - t_1)$$

The "exact" hole-blowing algorithm can thus be summarized as follows:
1. Determine the approximate timing t=t1 of a potential low-magnitude event in the signal.
2. In the temporal neighborhood of a potential low-magnitude event, calculate the pulse-shaped signal s(t) for at least two distinct time instants t1 and t2>t1, where t2−t1<<T. In the case of symbol-rate hole-blowing, the signal s(t) is calculated based on the later-to-be-applied bandlimiting pulse and some number of symbols in the vicinity of t1 and some number of symbols in the vicinity of t2. In the case of sample-rate (i.e., oversampled) hole-blowing, pulseshaping will have already been performed, such that s(t1) and s(t2) may be chosen to correspond with adjacent samples.
3. Calculate the minimum magnitude $\rho_{min}$ using the "locally-linear model", detailed above, and $t_{min}$, the time of $\rho_{min}$.
4. Compare the calculated minimum magnitude to the desired minimum magnitude.
5. If the calculated minimum magnitude is less than the desired minimum magnitude, calculate the in-phase and quadrature correction weights $C_I$ and $C_Q$, respectively, as detailed above.
6. Weight two copies of the pulse-shaping filter by the in-phase and quadrature correction values, respectively.
7. Add these weighted copies of the pulse-shaping filter to the in-phase and quadrature components of the signal, referenced to $t_{min}$.
8. Translate the modified in-phase and quadrature components to magnitude and phase, forming the signals to be processed by a polar modulator.

Figure 10:
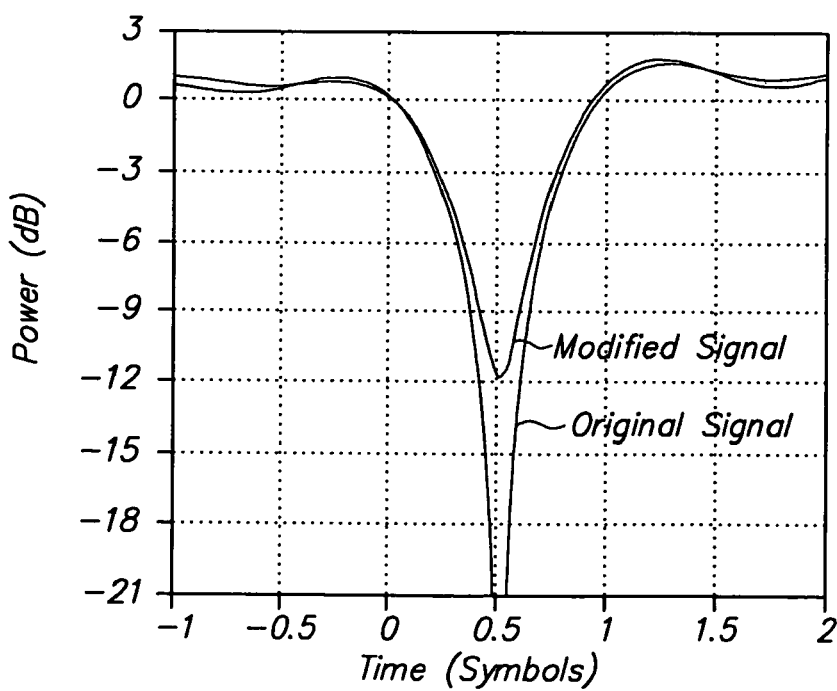
FIG. 10 shows a comparison of the original signal power and the power of the signal after addition of a single, complex-weighted pulse designed to keep the minimum power above −12 dB of average power.
Figure 11:
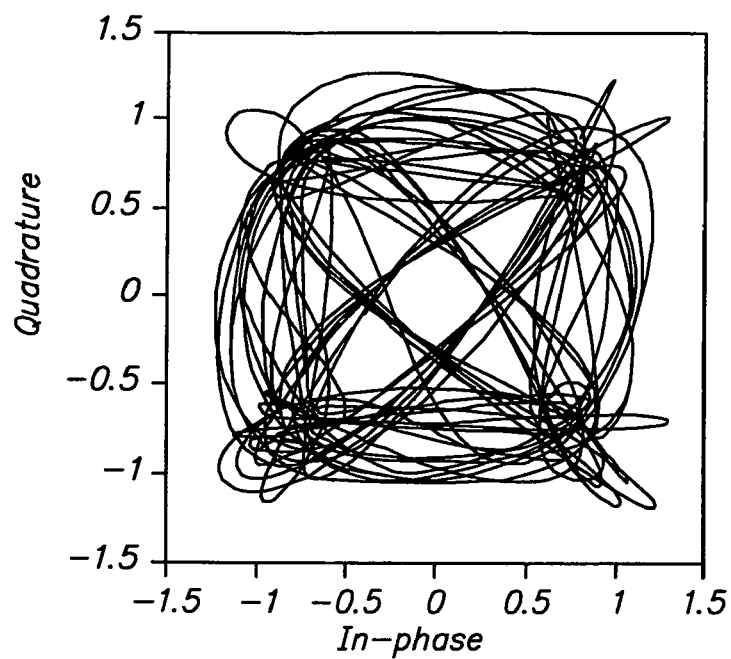
FIG. 11 is an I-Q plot of a QPSK signal that has been modified to keep the instantaneous power greater than −12 dB relative to the RMS power.

The effectiveness of the exact hole-blowing method described above is evident in FIG. 10, compareing the instantaneous power of the original QPSK signal to the signal after processing with the exact hole-blowing method. The threshold for desired minimum power in this example was selected to be 12 dB below RMS power. It can be seen that the exact hole-blowing method is highly effective in keeping the signal power above the desired minimum value. The I-Q plot of the QPSK signal after hole-blowing is shown in FIG. 11. It can be seen that all traces have been pushed outside the desired limit. A "hole" appears in I-Q plot where none was evident before.

Figure 12:
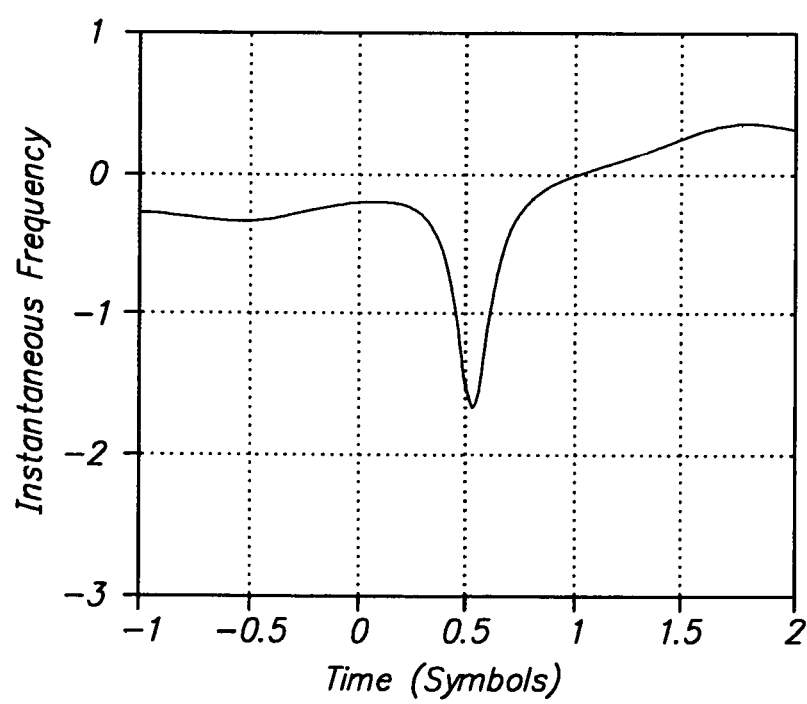
FIG. 12 shows the instantaneous frequency of the modified signal, expressed as a multiple of the symbol rate.

The instantaneous frequency of the modified signal is shown in FIG. 12. By comparison with FIG. 8, it can be seen that the instantaneous frequency has been reduced from approximately 45× the symbol rate to approximately 1.5× the symbol rate. Clearly the method has greatly reduced the instantaneous frequency.

Figure 13:
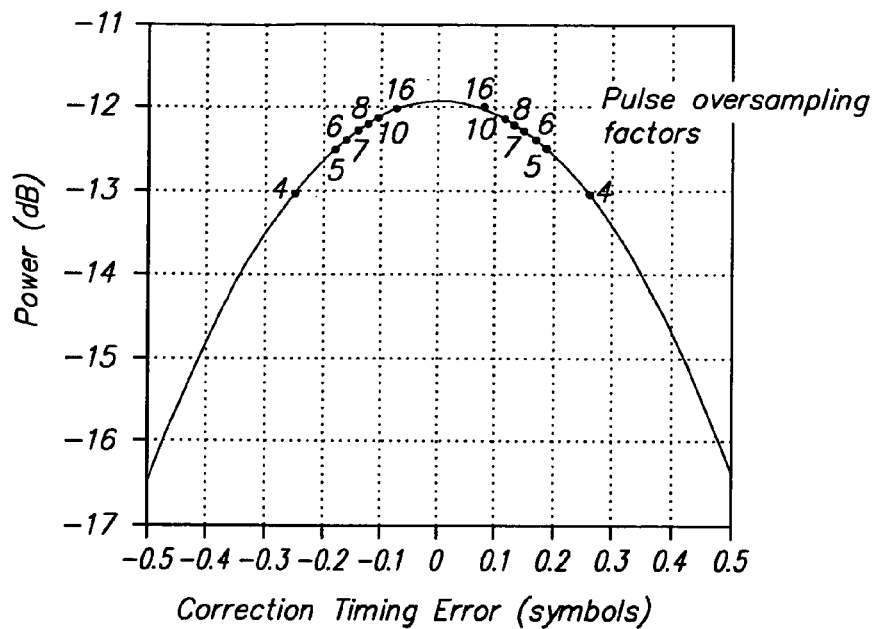
FIG. 13 shows minimum power in the modified signal as a function of error in the time at which the corrective pulse is added (the magnitude and phase of the corrective pulse are held constant)

It should be noted that the exact hole-blowing method described here is highly tolerant of timing error, but relatively intolerant of magnitude and phase error (or equivalent errors in the correction factors $c_I$ and $c_Q$). Timing error refers to the time at which the corrective pulse is added to the original signal. This tolerance to timing error is due to the fact that the pulse shaping filter generally will have a fairly broad magnitude peak relative to the duration of the low-magnitude event. The effect of this sort of timing error is shown in FIG. 13, where a timing error of up to one-fourth of a symbol period degrades the AMR by only 1 dB.

Figure 14:
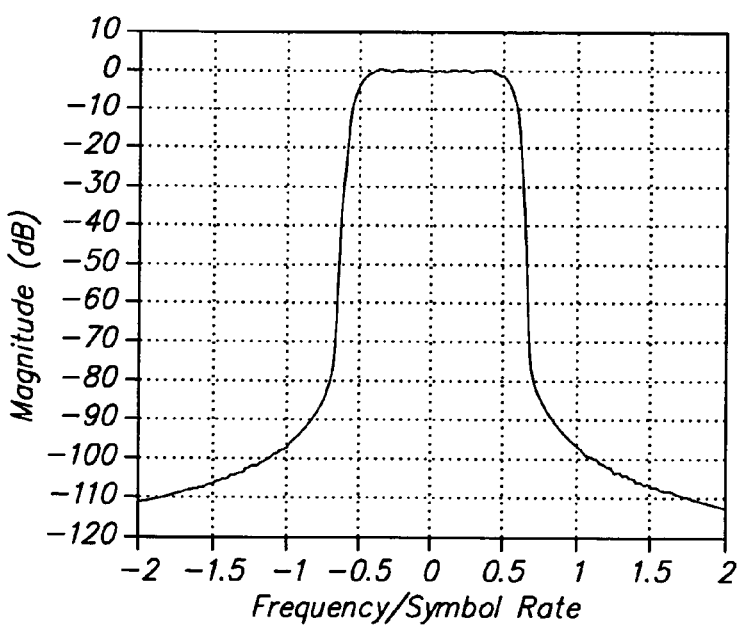
FIG. 14 shows estimated PSD of a conventional QPSK signal and the same signal after application of the exact hole-blowing method.
Figure 15A:
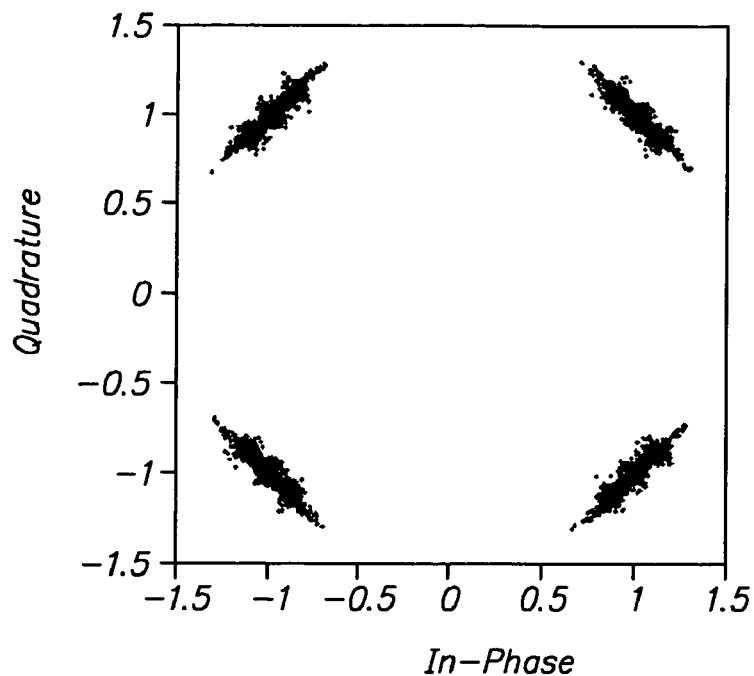
FIG. 15a is an I-Q plot of the modified signal after demodulation, showing that some distortion has been introduced into the signal (the measured RMS EVM is 6.3%)

Having shown that the exact hole-blowing method is effective in removing low-magnitude events, the effect on in-band and out-of-band signal quality will now be described. The PSDs of the QPSK signal before and after hole-blowing are indistinguishable in the frequency domain as shown in FIG. 14. The effect on EVM is illustrated in FIG. 15a, showing an I-Q plot of the modified signal after matched-filtering and baud-synchronous sampling. The result shows the message that a receiver would obtain upon demodulation of the modified signal. It can be seen that distortion has been introduced to the signal, in that not all samples fall exactly on one of the four QPSK constellation points. The RMS EVM can be defined as $$\sigma_{evm} = \sqrt{\frac{\frac{1}{N}\sum_{k=0}^{N-1}|a_k - \hat{a}_k|^2}{\sqrt{\frac{1}{N}\sum_{k=0}^{N-1}|a_k|^2}}}$$

where $\alpha_k$ and $\hat{\alpha}_k$ are, respectively, the ideal and actual PAM symbols. For the particular example illustrated in FIG. 14, the RMS EVM was calculated using N=16384 symbols and found to be 6.3%. Similarly, the peak EVM is defined as follows:

$$pk_{evm} = \max\frac{|a_k - \hat{a}_k|}{\sqrt{\frac{1}{N}\sum_{k=0}^{N-1}|a_k|^2}}$$

In this example, the peak EVM is found to be about 38%. If the signal is allowed to have greater magnitude dynamic range, the RMS EVM will be lower. Recall, however, that increasing the allowed magnitude dynamic range also increases the bandwidth and peak value of the instantaneous frequency. Accordingly, a tradeoff can be made between the desired signal quality (EVM) and the instantaneous frequency requirements placed on a practical polar modulator.

To assure an imperceptible effect on the signal PSD (see FIG. 14), the choise of the correction pulse shape should substantially match the signal band limiting pulse shape. When the pulse oversampling rate is four or more (samples per symbol time), the preceding algorithm can be simplified. Specifically, the calculation of $t_{min}$ can be eliminated, and the correction pulse is inserted time-aligned with the existing signal sample s(t1). As shown in FIG. 13, the maximum error in minimum magnitude is 1 dB for 4× oversampling, and decreases to 0.2 dB for 8× oversampling.

Figure 15B:
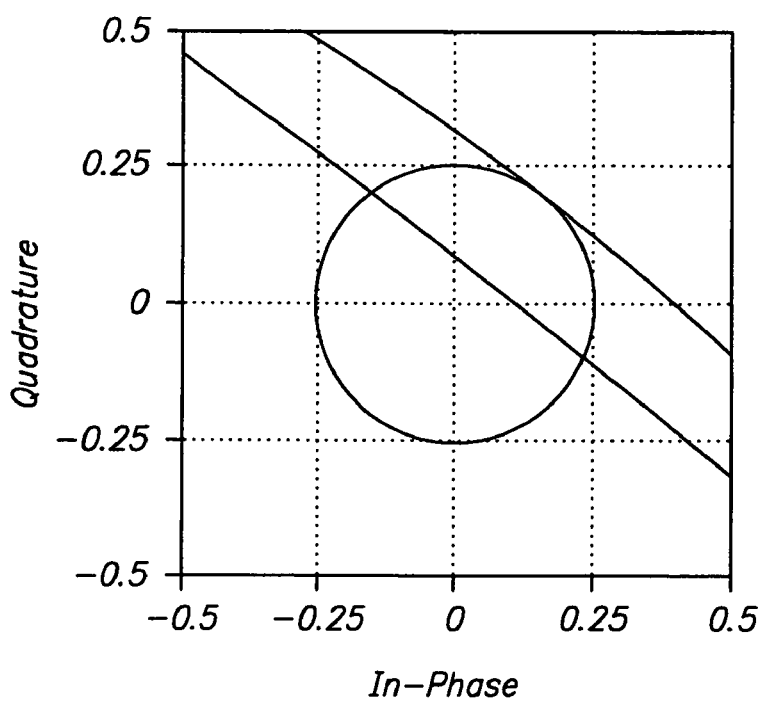
FIG. 15b illustrates the results of non-linear filtering using a root-raised cosine pulse that is the same as the pulse-shaping filter.
Figure 15C:
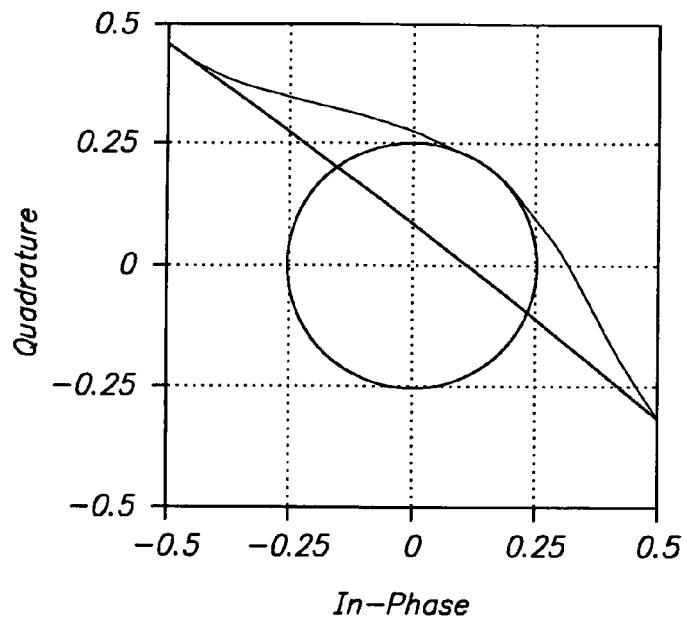
FIG. 15c illustrates the results of non-linear filtering using a Hanning window for the correction pulse, with the time duration equal to ½ the symbol duration.

The difference in practice between an approach in which hole-blowing is performed taking account of $t_{min}$ and an approach in which the calculation of $t_{min}$ can be eliminated is illustrated in the examples of FIGS. 15b and 15c, respectively. In the example of FIG. 15b, hole-blowing was performed using a root-raised cosine pulse that was the same as the pulse-shaping pulse. In the example of FIG. 15c, hole-blowing was performed using a Hanning window for the correction pulse, with a time duration equal to ½ the symbol duration. As may be seen, in FIG. 15c, the original signal trajectory is changed as little as possible in order to skirt the region of the hole. In many instances (if not most), however, the calculation of $t_{min}$ can be eliminated (as in FIG. 15b).

Figure 16A:
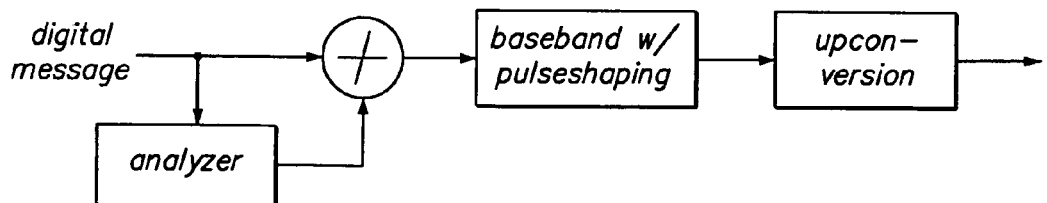
FIG. 16a is a block diagram illustrating symbol-rate hole-blowing.

FIG. 16a shows an arrangement for symbol-rate hole-blowing. A digital message is applied to a main path in which pulse-shaping and upconversion are performed. An auxiliary path includes an analyzer block that produces a correction signal. An adder is provided in the main path to sum together the main signal and the correction signal produced by the analyzer.

Figure 16B:
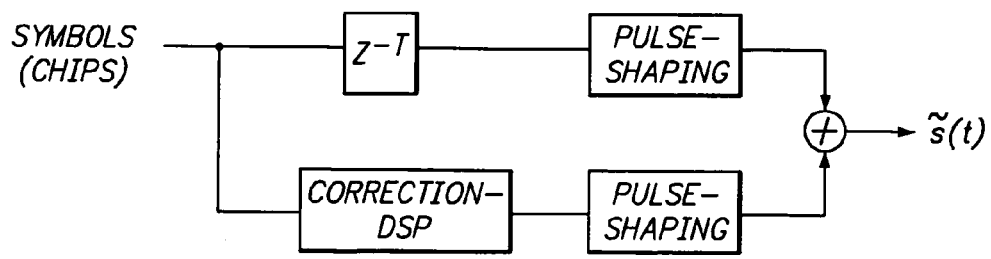
FIG. 16b is a more detailed block diagram illustrating symbol-rate hole-blowing.

Referring to FIG. 16b, a particularly advantageous embodiment for performing symbol-rate hole-blowing is shown. Two signal paths are provided, a main path and an auxiliary path. Outputs of the main signal path and the auxiliary signal path are summed to form the final output signal.

The main signal path receives symbols (or chips) and performs pulse-shaping on those symbols (or chips), and is largely conventional. However, the main signal path includes a delay element used to achieve synchronization between the main signal path and the auxiliary signal path.

In the auxiliary path, the symbols (or chips) are applied to a correction DSP (which may be realized in hardware, firmware or software). The correction DSP performs hole-blowing in accordance with the exact method outlined above and as a result outputs an auxiliary stream of symbols (or chips). These symbols (or chips) will occur at the same rate as the main stream of symbols (or chips) but will be small in magnitude in comparison, and will in fact be zero except when the signal of the main path enters or is near the hole. The relative timing of the main and auxiliary paths may be offset by T/2 such that the small-valued symbols of the auxiliary path occur at half-symbol timings of the main signal path.

In an exemplary embodiment, the correction DSP calculates the signal minimum with respect to every successive pair of symbols (or chips), by calculating what the signal value would be corresponding to the respective symbols (or chips) and applying the locally linear model. In calculating what the signal value would be corresponding to a symbol (or chip), the same pulse as in the main signal path and is applied to that symbol (or chip) and some number of previous and succeeding symbols (or chips). This use of the pulse to calculate what the value of the signal at a particular time will be following pulse-shaping is distinct from the usual pulse-shaping itself.

After the correction symbols (or chips) of the auxiliary signal path have been determined, they are pulse-shaped in like manner as those of the main signal path. The pulse-shaped output signals of the main and auxiliary paths are then combined to form the final output signal.

Since the duration of p(t) is finite (L), the signal can be evaluated ahead of time for the correlation between low-magnitude events and the input symbol stream ($L^M$ cases). The analyzer can then operate solely on the $\{a_i\}$ to determine the $c_i$ and $t_i$. (The correction symbols $c_i$ are very small, and have negligible effect on the message stream.) In this variant of symbol-rate hole-blowing, the calculated symbols $b_m$ are added to the original message stream, and the entire new stream is bandlimited once through the filter.

Iterative Methods

The foregoing description has focused on symbol-rate and sample-rate hole-blowing techniques. Although the term "exact" has been used to refer to the these techniques, some inaccuracy and imprecision is inevitable. That is, the resulting signal may still impinge upon the desired hole. Depending on the requirements of the particular system, it may be necessary or desirable to further process the signal to remove these residual low-magnitude events. One approach it to simply specify a bigger hole than is actually required, allowing for some margin of error. Another approach is to perform hole-blowing repeatedly, or iteratively.

Figure 16C:
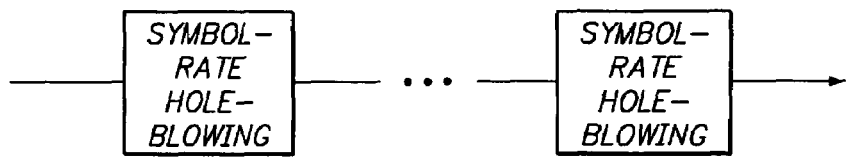
FIG. 16c is a block diagram illustrating the iteration of symbol-rate hole-blowing.
Figure 16D:
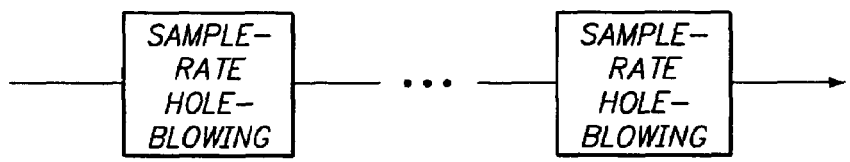
FIG. 16d is a block diagram illustrating the iteration of sample-rate hole-blowing.
Figure 16E:
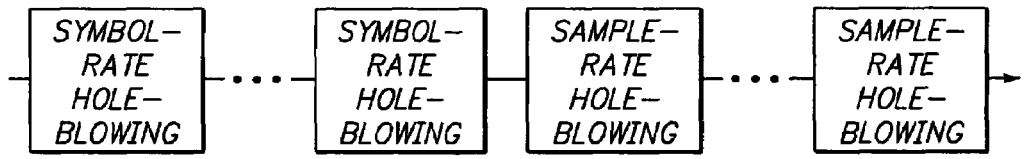
FIG. 16e is a block diagram illustrating the concatenation of one or more iterations of symbol-rate hole-blowing followed by one or more iterations of sample-rate hole-blowing.

In the quadrature domain, symbol-rate hole-blowing may be performed one or multiple times (FIG. 16c) and sample-rate hole-blowing may be performed one or multiple times (FIG. 16d). In the latter case, however, at each iteration, the symbol rate is doubled. For example, in a first iteration, correction symbols may be inserted at T/2. In a second iteration, correction symbols may be inserted at T/4 and 3T/4, etc. One or more iterations of symbol-rate hole-blowing may be followed by one or more iterations of sample-rate hole-blowing (FIG. 16e). (In general, sample-rate hole-blowing cannot be followed by symbol-rate hole-blowing.)

Another alternative is sample-rate hole-blowing in the polar domain.

Polar-Domain Hole-Blowing

The foregoing quadrature-domain hole-blowing techniques preserve ACLR very well at the expense of some degradation in EVM. Other techniques may exhibit a different tradeoff. For example, polar-domain hole-blowing preserves EVM very well at the expense of ACLR. Therefore, in a particular application, quadrature-domain hole-blowing, polar-domain hole-blowing, or a combination of both, may be applied.

The magnitude and phase components of a polar coordinate system can be related to the in-phase and quadrature components of a rectangular coordinate system as $$\rho(t) = \sqrt{s_I^2(t) + s_Q^2(t)}$$

$$\theta(t) = \tan^{-1}(s_Q(t)/s_I(t))$$

Figure 17A:
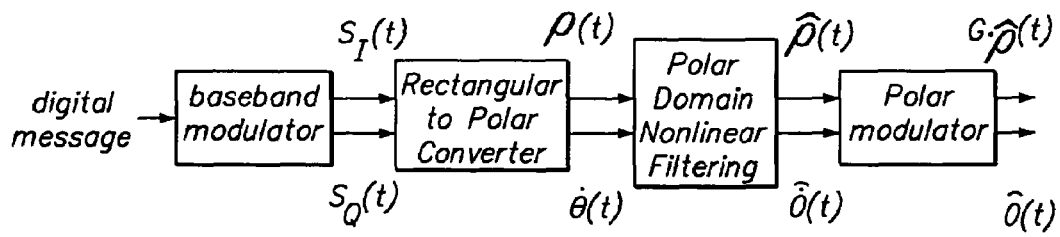
FIG. 17a is a block diagram of a portion of a radio transmitter in which polar domain nonlinear filtering is performed.

FIG. 17a is a block diagram of a portion of a radio transmitter in which polar-domain nonlinear filtering (i.e., "hole-blowing") is performed. The diagram shows how magnitude and phase as expressed in the foregoing equations are related to polar-domain nonlinear filtering and the polar modulator.

In FIG. 17a, G represents gain of the polar modulator. In operation, the digital message is first mapped into in-phase and quadrature components in rectangular coordinate system. The in-phase and quadrature components are converted into magnitude and phase-difference by a rectangular-to-polar converter. By knowing the starting point of the phase and the phase-difference in time, the corresponding phase in time can be calculated. This phase calculation is done at a later stage, in the polar modulator. Before feeding the phase-difference to a polar modulator, polar-domain nonlinear filtering is performed.

Figure 17B:
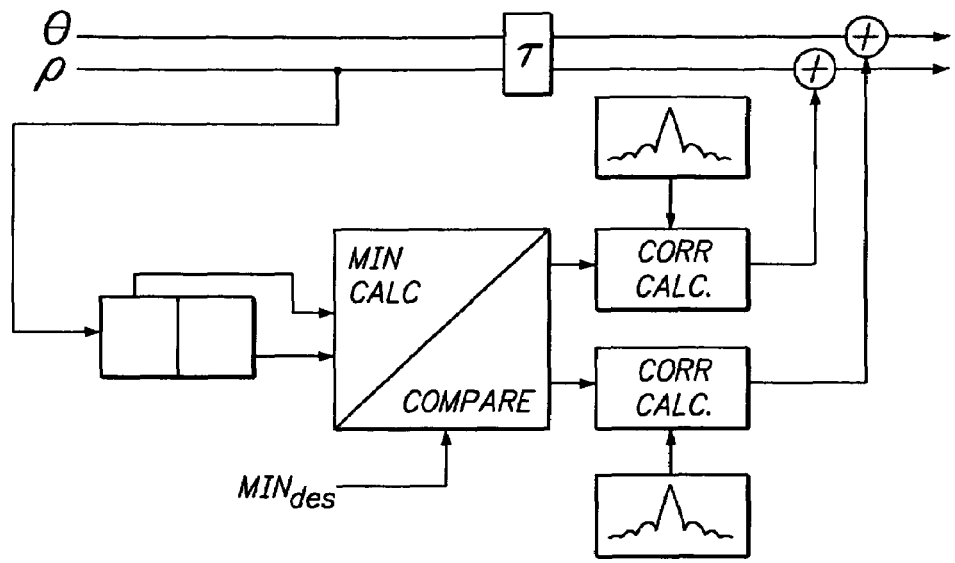

A more detailed block diagram is shown in FIG. 17b, illustrating a main signal path and a correction signal path for two signal channels, $\rho$ and $\theta$. In the correction path, sequential values of $\rho$ are used to perform a signal minimum calculation and comparison with a desired minimum. If correction is required based on the comparison results, then for each channel the magnitude of the required correction is calculated. A pulse (or pair of pulses in the case of the $\theta$ channel) is scaled according to the required correction and added into the channel of the main path, which will have been delayed to allow time for the correction operations to be performed.

Figure 18:
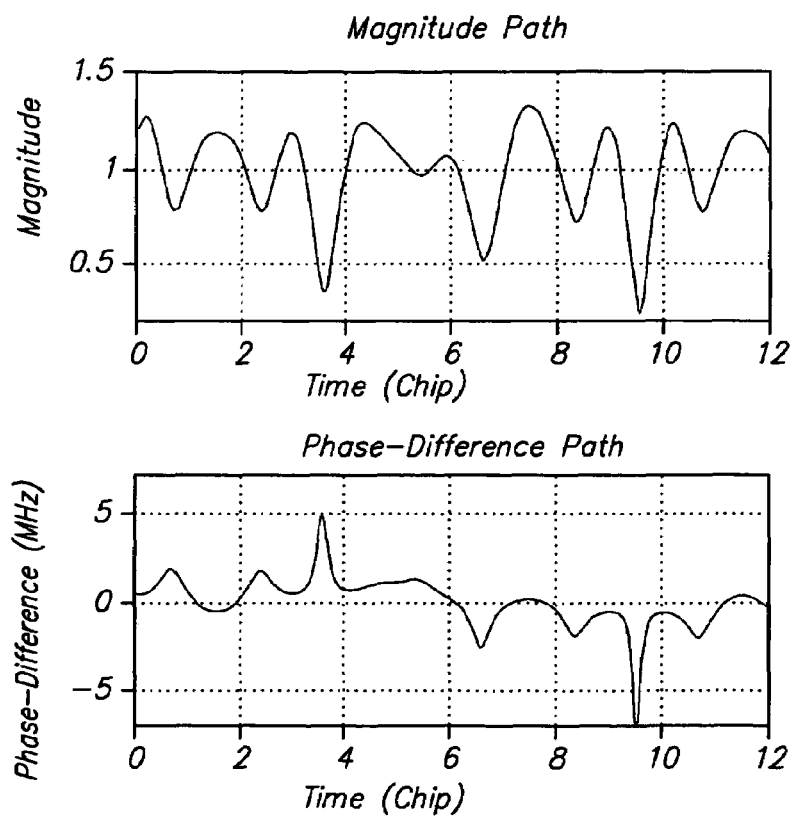
FIG. 18 is a waveform diagram showing the magnitude component of the polar coordinate signal and showing the difference of the phase component of the polar coordinate signal.

An example of the magnitude and phase components (phase-difference) in polar coordinates is shown in FIG. 18. As can be seen from the plot, when the magnitude dips, there is a corresponding spike (positive or negative) in the phase-difference component.

The spike in the phase-difference component suggests that there is a rapid phase change in the signal, since the phase and phase-difference have the following relationship:

$$\theta(t) = \int \dot{\theta}(t) dt$$

The dip in magnitude and the rapid phase change are highly undesirable as both peaks expand the bandwidth of each polar signal component. The goal of the polar domain nonlinear filtering is to reduce the dynamic range of the amplitude swing as well as to reduce the instantaneous phase change. The dynamic range of the amplitude component and the maximum phase change a polar modulator can handle is limited by the hardware. Polar domain nonlinear filtering modifies the signal before the signal being processed by the polar modulator. This pre-processing is to ensure that the signal dynamic range will not exceed the limit of the implemented hardware capability of the polar modulator, and therefore avoids unwanted signal distortion.

Nonlinear filtering in a polar coordinate system is somewhat more complex than nonlinear filtering in a rectangular coordinate system. Both components (magnitude and phase) in the polar coordinate system have to be handled with care to prevent severe signal degradation.

The following description sets forth how polar-domain nonlinear filtering is performed in an exemplary embodiment. Polar-domain nonlinear filtering is composed of two parts. The first part is nonlinear filtering of magnitude component, and the second part is nonlinear filtering of the phase component (phase-difference). These two parts will each be described in turn.

Nonlinear Filtering of Magnitude Component

If the magnitude dynamic range exceeds the capability of the polar modulator, the output signal will be clipped. This clipping will result in spectral re-growth and therefore greatly increase the adjacent channel leakage ratio (ACLR). One method that can be applied to reduce the dynamic range of the magnitude component is hole-blowing (or nonlinear filtering).

The purpose of this nonlinear filtering of the magnitude component is to remove the low magnitude events from the input magnitude $\rho(t)$, and therefore reduce the dynamic range of the magnitude swing. Assume a threshold ($TH_{mag}$) for the minimum magnitude; by observing the signal $\rho(t)$, it is possible to obtain the time intervals where the signal falls below the threshold. Assume there are N time intervals where the signal falls below the threshold and that the magnitude minimums for each of these time intervals happen at $t_1, \ldots, t_N$, respectively. Therefore, the nonlinear filtering of magnitude component can be expressed as:

$$\tilde{\rho}(t) = \rho(t) + \sum_{n=1}^{N} b_n p_n(t - t_n)$$

where $b_n$ and $p_n(t)$ represent the inserted magnitude and pulse for the n th time interval. The nonlinear filtered signal is composed of the original signal and the inserted pulses. The magnitude of the inserted pulse is given as:

$$b_n = TH_{mag} - \rho(t_n)$$

Figure 19:
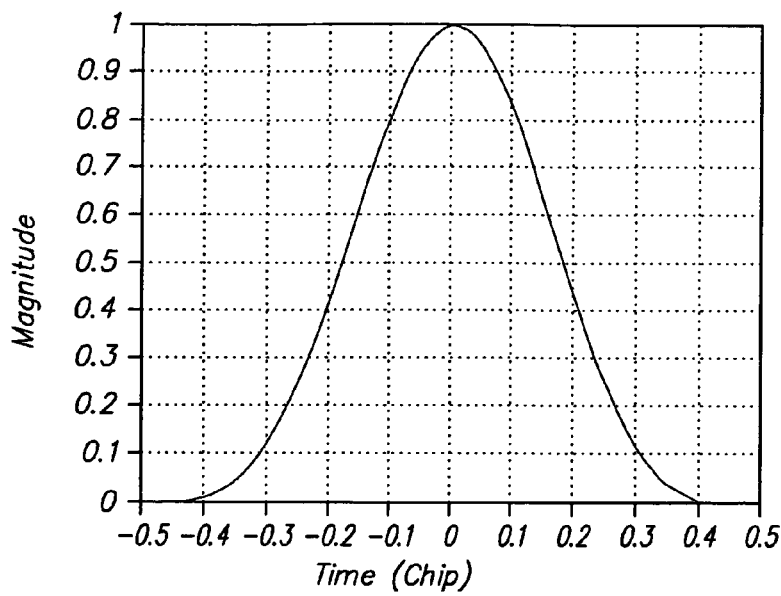
FIG. 19 is a diagram of the impulse response of a DZ3 pulse.

The inserted pulse $p_n(t)$ has to be carefully chosen so that the signal degradation with respect to ACLR is minimized. It is desirable for the pulse function to have smooth leading and trailing transitions. A suitable pulse (DZ3) is based on McCune's paper entitled "The Derivative-Zeroed Pulse Function Family," *CIPIC Report* #97-3, University of California, Davis, Calif., Jun. 29, 1997. The impulse response of the DZ3 pulse is plotted in FIG. 19.

Figure 20:
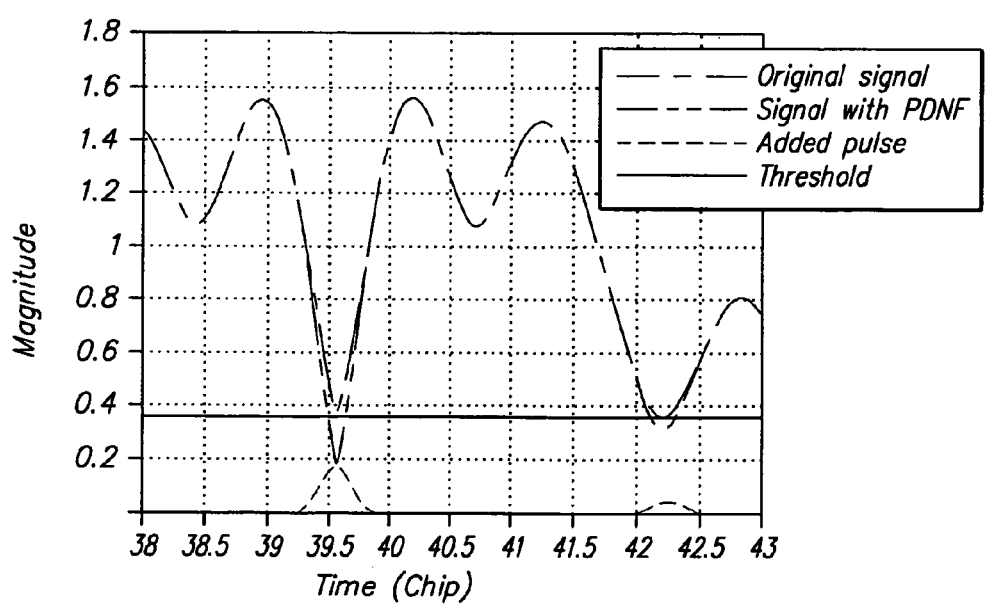
FIG. 20 is a waveform diagram showing results of nonlinear filtering of the magnitude component (showing the original magnitude component before polar domain nonlinear filtering, the magnitude component after the polar domain nonlinear filtering, the threshold, and the pulses added to the magnitude component)

Results of an example for nonlinear filtering of the magnitude component are shown in FIG. 20. As can be seen from the plot, signal intervals where the magnitude dropped below the threshold are compensated by the inserted pulses. As a result, the dynamic range of the magnitude swing is reduced.

Nonlinear Filtering of Phase Component

In an exemplary embodiment, the input to the polar modulator is phase-difference, not phase. A voltage-controlled oscillator (VCO) in the polar modulator integrates the phase-difference and produces the phase component at the output of the polar modulator. The phase-difference is directly related to how fast the VCO has to integrate. If the phase-difference exceeds the capability of the VCO, the output signal phase will lag (or lead) the actual signal phase. As a result, phase jitter will occur if the VCO is constantly unable to keep up with the actual signal phase. This phase jitter will result in constellation rotation, and may therefore severely degrade EVM.

The purpose of the nonlinear filtering of phase component is to suppress large (positive or negative) phase-difference events so that phase accumulation error will not occur. It is important to know that the output of the VCO is an accumulation of the input (phase-difference). Therefore, any additional processing to the phase-difference has to ensure that the phase error will not accumulate. The nonlinear filtering of the phase component described presently carefully modifies the phase-difference in a way that the accumulated phase might deviate from the original phase trajectory from time to time. However, after a certain time interval, it will always merge back to the original phase path.

Nonlinear filtering of the phase component is done by first finding the location where the absolute value of the phase-difference is beyond the integral capability of the VCO. Assume there are a total of M events where the absolute values of the phase-difference are beyond the capability of the VCO, and that the peak absolute value for each event happens at $t_m$. Nonlinear filtering of the phase-difference component may then be described by the following expression:

$$\tilde{\dot{\theta}}(t) = \dot{\theta}(t) + \sum_{m=1}^{M} c_m p_{p,m}(t - t_m)$$

where $p_{p,m}(t)$ is the pulse inserted to the phase-difference component at time $t_m$, and $c_m$ is the corresponding magnitude given by $$c_m = TH_p - \dot{\theta}(t_m)$$

where $TH_p$ is the threshold for the phase-difference.

The inserted pulse should satisfy the following equation $$\int p_{p,m}(t) dt = 0$$

The result of inserting a pulse is basically the same as altering the phase trajectory. However, by inserting pulses that satisfy the above equation, the modified phase trajectory will eventually merge back to the original phase trajectory. This can be seen by the following equation:

$$\int \hat{\theta}(t)dt = \int \theta(t)dt + \sum_{m=1}^{M} c_m \int p_{p,m}(t)dt$$

The second term on the right-hand side will eventually disappear. Therefore, the modified phase trajectory will merge back to the original phase trajectory.

Figure 21:
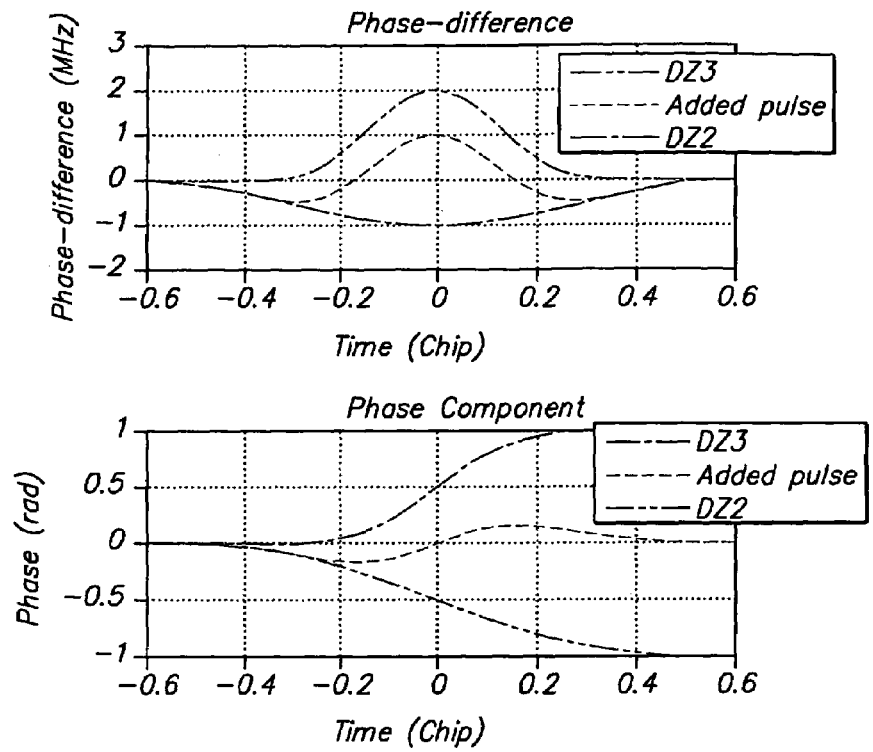
FIG. 21 shows an example of an added pulse suitable for nonlinear filtering of the phase component.

An example of an added pulse $p_p(t)$ suitable for nonlinear filtering of the phase component is plotted in FIG. 21. Again, it is very important for the pulse function to have smooth leading and trailing transitions. The pulse used for nonlinear filtering at the phase-difference path is composed of two pulses. These two pulses have the same area but different polarity and durations. Therefore, the integration of the combined pulse with respect to time is zero.

Figure 22:
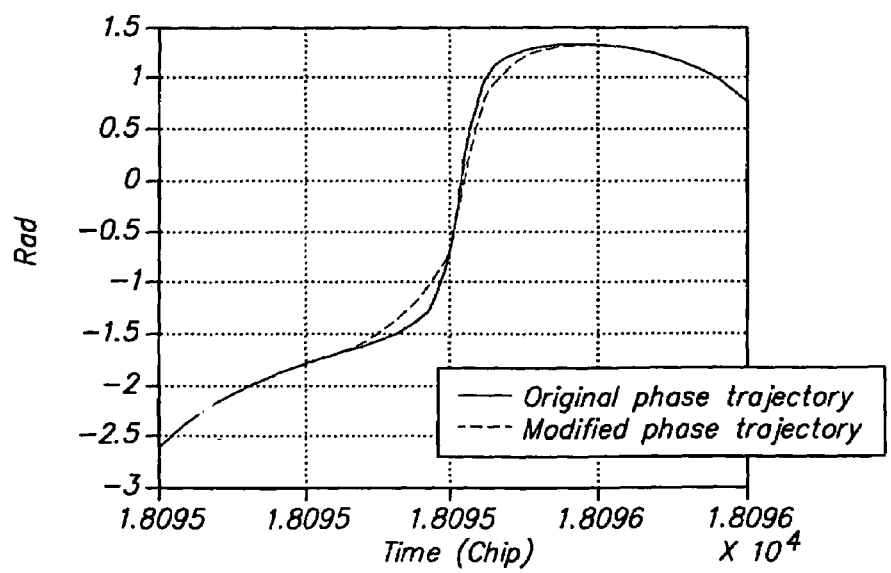
FIG. 22 is a waveform diagram showing results of nonlinear filtering of the phase-difference component.

Results of an example of nonlinear filtering of the phase-difference component are shown in FIG. 22. As can be seen from the plot, the modified phase trajectory has a smoother trajectory than the original phase trajectory. The modified phase trajectory requires less bandwidth from the VCO than the original phase trajectory.

Polar-domain nonlinear filtering is composed of the filtering of magnitude and phase components. If the nonlinear filtering is done jointly (both magnitude and phase), better spectral roll-off can be achieved. However, each nonlinear filtering operation can also be done independently.

Figure 23:
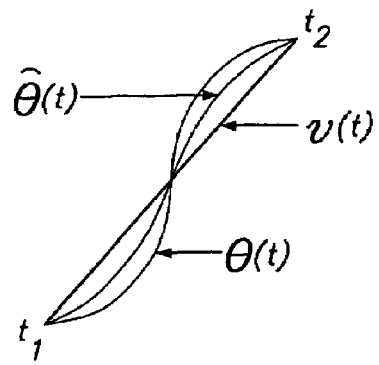
FIG. 23 illustrates an alternate way for nonlinear filtering of the phase component in a polar coordinate system.

Instead of nonlinear filtering of the phase-difference component, direct nonlinear filtering of the phase component can also be implemented. FIG. 23 shows an example in which the original signal has a steep increase in phase from time $t_1$ to $t_2$. One way of reducing the phase change is by interpolating between the straight line v(t) and the original phase path. The interpolation can be expressed as:

$$\hat{\theta}(t) = w(t)\theta(t) + (1-w(t))v(t)$$

where w(t) is a weighting factor. The weighting factor can be a constant or may vary in accordance with DZ3, a Gaussian function, or the like. Again, it is important for the weighting function to have smooth leading and trailing edges.

Polar-domain nonlinear filtering can be used in concatenation with quadrature-domain nonlinear filtering. Such an approach may involve less computational complexity than iterative quadrature-domain nonlinear filtering.

Figure 24:
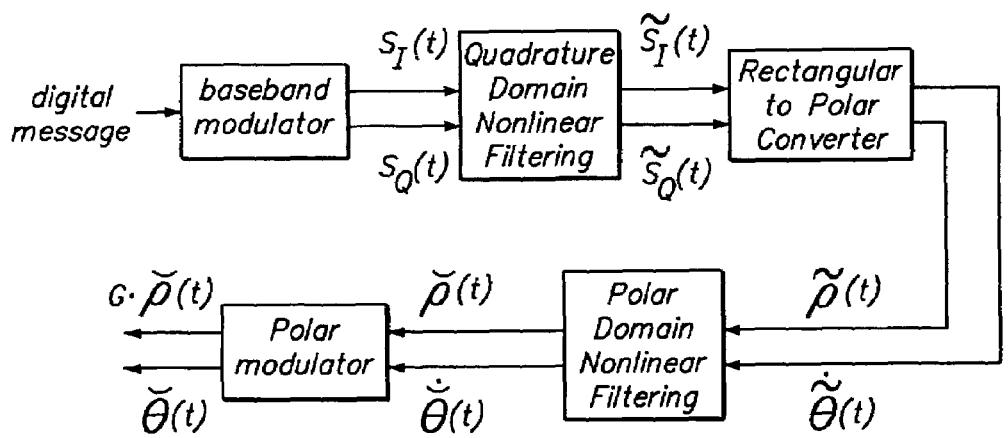
FIG. 24 is a block diagram of a portion of a radio transmitter in which nonlinear filtering is performed first in the quadrature domain and then in the polar domain.
Figure 25:
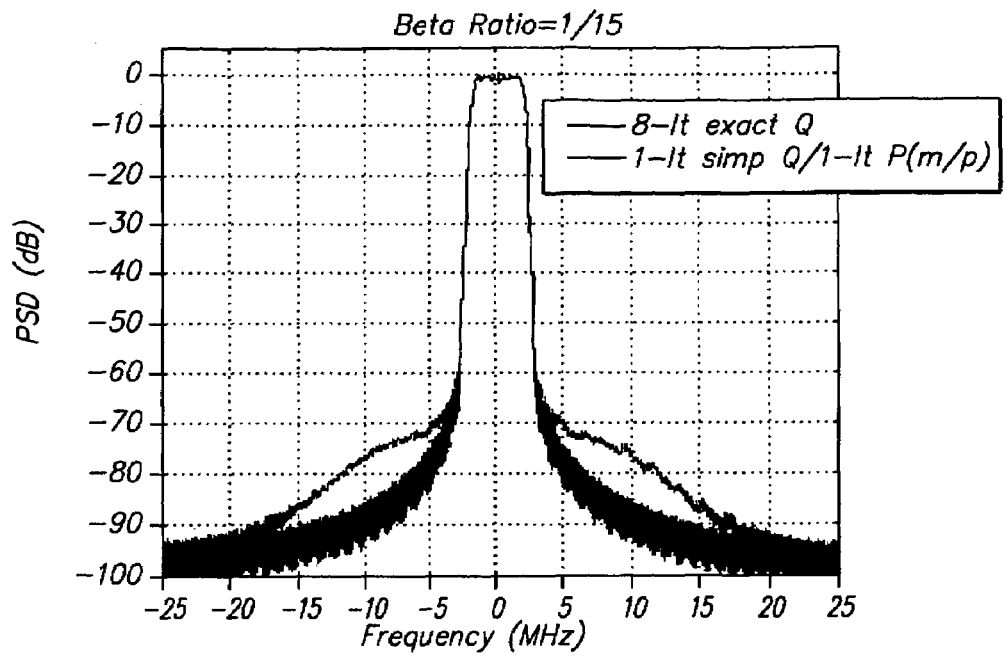
FIG. 25 is a Power Spectral Density (PSD) showing results of the nonlinear filtering of FIG. 24.

If only one iteration of quadrature-domain nonlinear filtering is performed, low-magnitude, high-phase-variation events may still occur, but with low probability. These low probability events can degrade signal quality if not properly managed. To eliminate these low-probability events, the foregoing polar-domain nonlinear filtering method may be used following a single iteration of quadrature-domain nonlinear filtering, maintaining low EVM and low ACLR. FIG. 24 shows the block diagram for this concatenated system. FIG. 25 shows the PSD of the output signal processed by the quadrature-polar nonlinear filtering module. Curve A represents the signal with eight iterations of quadrature-domain non-linear filtering. Curve B represents the signal with one iteration of quadrature-domain nonlinear filtering followed by one iteration of polar-domain nonlinear filtering. Spectral re-growth is below −60 dB. In addition, good spectral roll-off is achieved.

Reduction of Computational Load for Real-Time Applications

In a practical polar modulator, the hole-blowing algorithm must be implemented in real-time using digital hardware and/or software. Real-time implementation of the exact hole-blowing method presents several challenges. The particular challenges faced are, to some extent, dependent on the overall architecture selected. There are (at least) two alternative architectures for implementing the exact hole-blowing, algorithm. In the first architecture, referred to as symbol-rate hole-blowing, corrective impulses are calculated and added to the data stream with appropriate timing, after which pulse shaping is performed. In the second architecture, referred to as sample-rate (or oversampled) hole-blowing, the full pulse-shaped signal is calculated, after which weighted pulses are added to the pulse-shaped signal.

Because of its computational complexity, the exact hole-blowing algorithm described earlier is difficult to implement using digital hardware. In the exact hole-blowing algorithm, arithmetic division, square, and square-root operations are required. These arithmetic operations greatly increase the complexity of the digital hardware and should be avoided if possible. Reduction in computational complexity of the implemented algorithm leads directly to a reduction in hardware complexity. The real-time hole-blowing algorithm described herein requires no division, square, or square-root operations.

Although a real-time hole-blowing algorithm can be implemented in either symbol-rate or sample-rate form, it is generally more desirable to implement symbol-rate hole-blowing. In particular, symbol-rate hole-blowing algorithm allows the digital hardware to be operated at a slower clock speed and does not require as much memory to perform pulse insertion. A symbol-rate real-time hole-blowing algorithm will therefore be described.

Generally speaking, real time hole-blowing algorithm is very similar to the exact hole-blowing algorithm. However, some assumptions and approximations are made in real time hole-blowing algorithm to simplify implementation. In the real-time hole-blowing algorithm, assumptions are made regarding where magnitude minimums are most likely to occur based on the structure of the signal constellation(s). The assumption allows for determination of where to insert the pulse, if needed, without calculating the entire signal magnitude. In addition, the arithmetic operations in exact hole-blowing algorithm are greatly simplified by normalizing the expression $\sqrt{\Delta x^2 + \Delta y^2}$ to one. This normalization eliminates the need for division, square, and square-root operations.

The differences between the real-time and exact hole-blowing algorithms may be appreciated by considering answers to the following questions:

1. What are the potential timings for the low-magnitude events?
2. What are the values of magnitude minimums, and how can they be calculated efficiently and accurately?
3. What are the in-phase and quadrature correction weights of the magnitude minimum if a signal falls below the prescribed threshold?

These questions will be addressed using the UMTS signal as an example.

1. What are the Potential Timings for the Low-Magnitude Events?

If the timings of the magnitude minimums can be estimated based on the input data bits, then it is not necessary to calculate the whole waveform in order to obtain the magnitude minimums. This shortcut affords a great saving in computation. The locally linear model can be used to calculate the minimums with great accuracy if the approximate timing for low-magnitude events is known.

Figure 26:
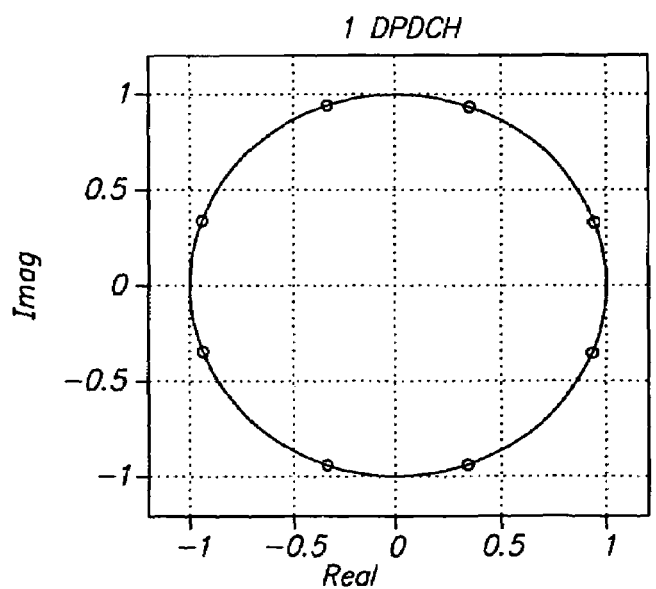
FIG. 26 is an I-Q plot for the UMTS signal constellation with one active data channel and a beta ratio of 7/15.

As previously described, the minimum magnitudes for a bandlimited QPSK signal usually occur close to half-symbol instance (nT+T/2). This assumption is supported by the histogram in FIG. 6. This assumption can also be applied to higher-order pulse-shaped PSK signals whose constellation points lie on the same circle. A good example for this type of signal is the UMTS signal with one active data channel. FIG. 26 shows an example of the UMTS signal constellations with one active data channel. As can be seen from the plot, all constellation points lie on the same circle. If a histogram is constructed for this particular signal, it may be seen that the timings for the low-magnitude events are very likely to happen at every half-symbol instance. Therefore, for this particular signal, it is assumed that the timings for the low-magnitude events will occur at time nT+T/2, where n is an integer.

Figure 27:
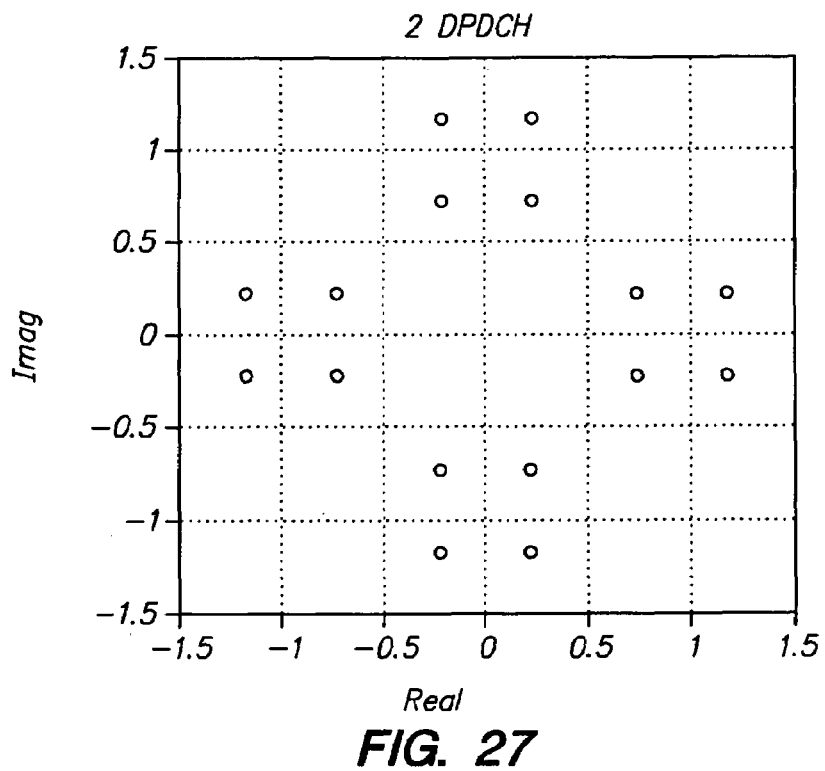
FIG. 27 is an I-Q plot for the UMTS signal constellation with two active data channels and a beta ratio of 7/15.
Figure 28A:
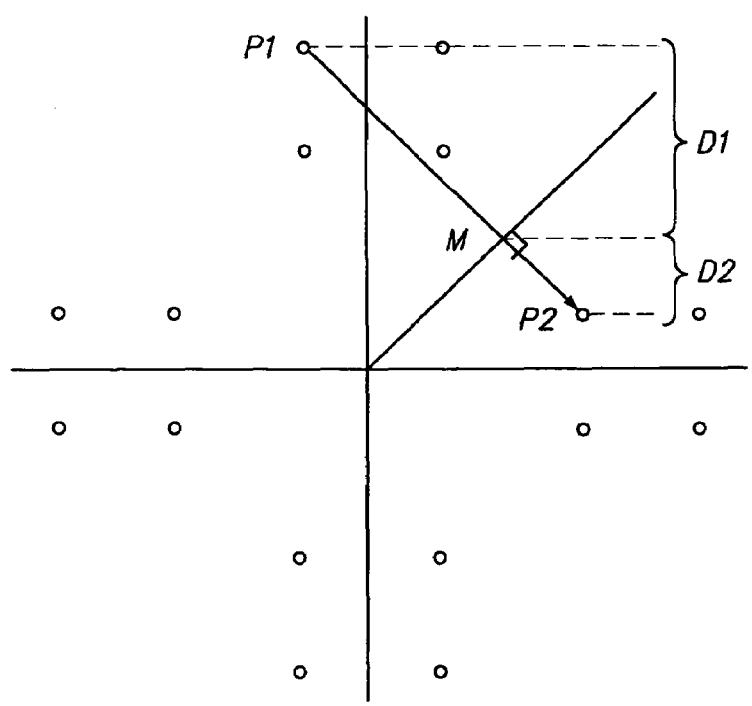
FIG. 28a illustrates the manner of finding the timings of low-magnitude events.

The above assumption will not be true in the case of a more complex signal constellation. FIG. 27 shows an example of the UMTS signal constellations with two active data channels. As can be seen from the plot, not all the constellation points lie on the same circle. The algorithm used to find the magnitude minimums for a more complex signal constellation is illustrated in FIG. 28a, and described as follows:

1. If the signal transitions from constellation point P1 at time nT and ends at point P2 at time (n+1)T, a straight line is drawn connecting the two points. This line is denoted as the first line.
2. A second line is drawn perpendicular to the line that connects P1 and P2. The second line includes the origin and intersects the first line at point M.
3. The second line divides the first line into two sections whose length are proportional to D1 and D2, respectively. The timing for the low-magnitude event is approximately nT+D1/(D1+D2)T.
4. If the second line and the first line do not intersect, there is no need for pulse insertion.
5. Having determined where the magnitude minimums are most likely to occur, the locally linear model is then used to calculate the local magnitude minimums.

With the above algorithm, a look-up table can be built for different signal constellations. The size of the look-up table can be reduced if the constellation points are symmetrical to both x and y axis. A special case of the foregoing algorithm occurs where D1 always equal to D2, corresponding to the UMTS signal with one active data channel. Therefore, the magnitude minimums for one active data channel always happens close to time nT+T/2. The above algorithm for finding the approximate locations of magnitude minimums can also be generalized to signals with more complex constellations.

Figure 28B:
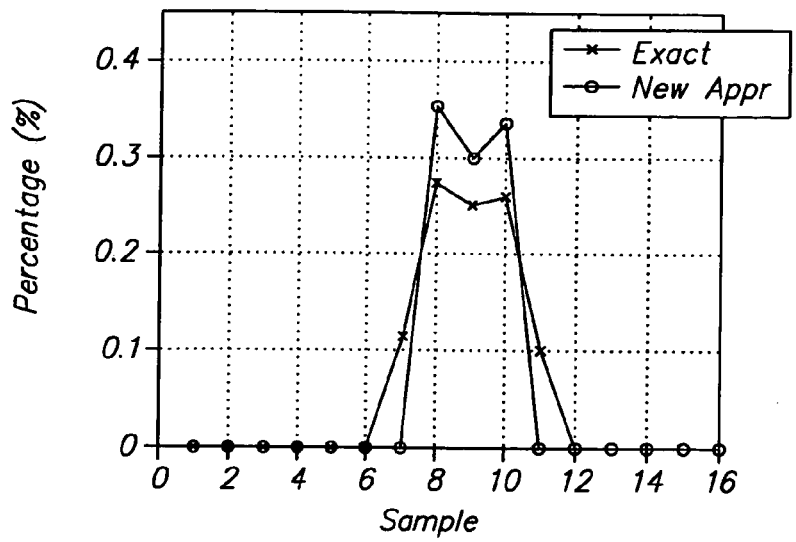
FIG. 28b compares probability density functions of low magnitude events using the exact algorithm and using the real-time approximation.

FIG. 28b shows the probability density function, by sample interval (assuming 15 samples per symbol), of minimum magnitude events where correction is required, for both the exact method described earlier and the real-time approximation just described. Note the close correspondence between the two functions.

2. What are the Values of the Magnitude Minimums, and How Can They be Calculated Efficiently and Accurately?

With the knowledge of the timing where the magnitude minimums are likely to occur, the locally linear model is then used to calculate the magnitude minimums. A determination must be made whether the magnitude of the signal falls below the prescribed threshold. If the magnitude falls below the prescribed threshold, in-phase and quadrature correction weights, $C_I$ and $C_Q$, for the inserted pulse have to be calculated.

From the exact hole-blowing algorithm, the magnitude minimum can be calculated by the following equation:

$$\rho_{\min} = \frac{|y1\Delta x - x1\Delta y|}{\sqrt{\Delta x^2 + \Delta y^2}}$$

where x1 and y1 are the in-phase and quadrature samples of the signal at time t1, and t1 is the time where the magnitude minimums are most likely to occur.

The equation above involves one division, one square-root operation, two square operations, as well as several other operations—multiplication, addition and subtraction. The computational complexity can be reduced by normalizing the denominator of the above equation.

Let the vector $(\Delta x, \Delta y)$ be expressed as:

$$\Delta x = \rho_{xy} \cos(\theta_{xy})$$

$$\Delta y = \rho_{xy} \sin(\theta_{xy})$$

where $\rho_{xy}$ and $\theta_{xy}$ are the magnitude and phase of the vector $(\Delta x, \Delta y)$. Then, the minimum magnitude of the signal can be expressed as $$\begin{aligned}\rho_{\min} &= \frac{|y1\Delta x - x1\Delta y|}{\sqrt{\Delta x^2 + \Delta y^2}} \\ &= \frac{\rho_{xy}|y1\cos(\theta_{xy}) - x1\sin(\theta_{xy})|}{\rho_{xy}\sqrt{\cos^2(\theta_{xy}) + \sin^2(\theta_{xy})}} \\ &= |y1\cos(\theta_{xy}) - x1\sin(\theta_{xy})|\end{aligned}$$

With this normalization, no division, square, or square-root operation is required. In addition, it is not necessary to know $\rho_{xy}$. However, the values of $\sin(\theta_{xy})$ and $\cos(\theta_{xy})$ are needed. Therefore, given a vector $(\Delta x, \Delta y)$, a way is needed to obtain $(\sin(\theta_{xy}), \cos(\theta_{xy}))$ efficiently.

Two ways will be described to evaluate $\sin(\theta_{xy})$ and $\cos(\theta_{xy})$ with relatively low hardware complexity. The first one uses a line-comparison method, and the second one uses the CORDIC (Coordinate Rotation for Digital Computer) algorithm.

Figure 29:
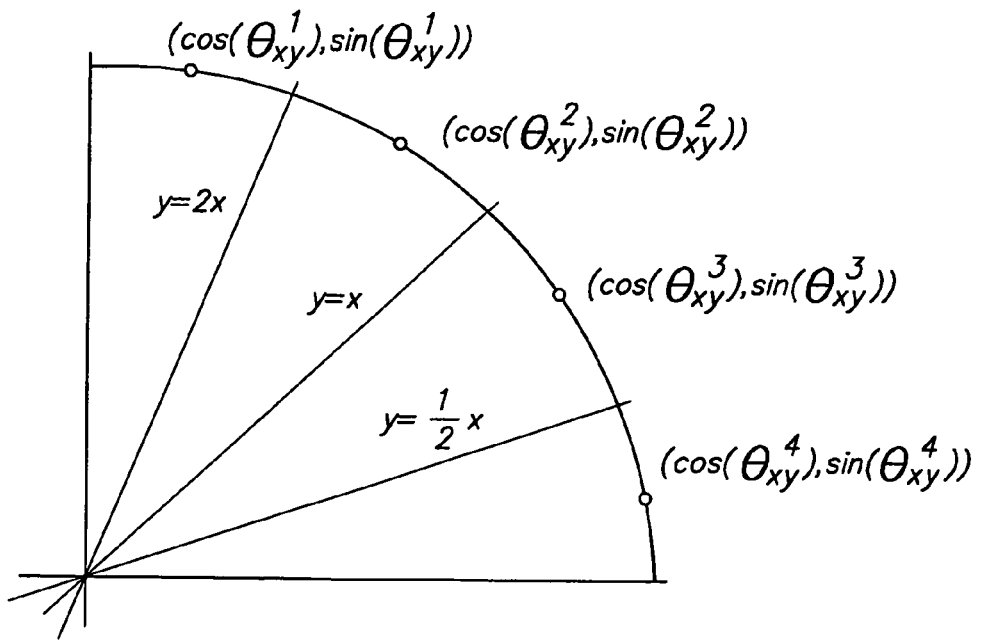
FIG. 29 is an I-Q plot illustrating a line-comparison method for vector quantization.

First, consider the approximation of $\sin(\theta_{xy})$ and $\cos(\theta_{xy})$ using a line-comparison method. As can be seen from FIG. 29, lines with a function of y=Mx partition the first quadrant into several sub-sections. By comparing the point $(|\Delta x|, |\Delta y|)$ against the lines y=Mx, the sub-section that the point $(|\Delta x|, |\Delta y|)$ falls into can be determined. Any point within a certain sub-section is represented by a pre-normalized point $(\sin(\theta_{xy}^i), \cos(\theta_{xy}^i))$, where i denotes the section the point $(|\Delta x|, |\Delta y|)$ belongs to.

The details of the algorithm are described as fellows:
1. First, convert the vector $(\Delta x, \Delta y)$ into the first quadrant $(|\Delta x|, |\Delta y|)$.
2. Compare $|\Delta y|$ with $M|\Delta x|$ where M is positive.
3. If $|\Delta y|$ is greater than $M|\Delta x|$, then $(|\Delta x|, |\Delta y|)$ is located at the left side of the line y=Mx.
4. If $|\Delta y|$ is smaller than $M|\Delta x|$, then $(|\Delta x|, |\Delta y|)$ is located at the right side of the line y=Mx.
5. Based on the above comparisons with different lines, the sub-section the point $(|\Delta x|, |\Delta y|)$ belongs to can be located. Assuming the point belongs to section i, then the vector $(\sin(\theta_{xy}), \cos(\theta_{xy}))$ can be approximated by the vector $(\text{sign}(\Delta y)*\sin(\Delta_{xy}^i), \text{sign}(\Delta x)*\cos(\theta_{xy}^i))$ A table is used to store the pre-calculated values of $(\sin(\theta_{xy}^i), \cos(\theta_{xy}^i))$. If a total of W lines are used for comparison, there will be (W+1) sub-sections in the first quadrant. As a result, the whole vector plane is being divided into 4*(W+1) sub-sections.

Figure 30:
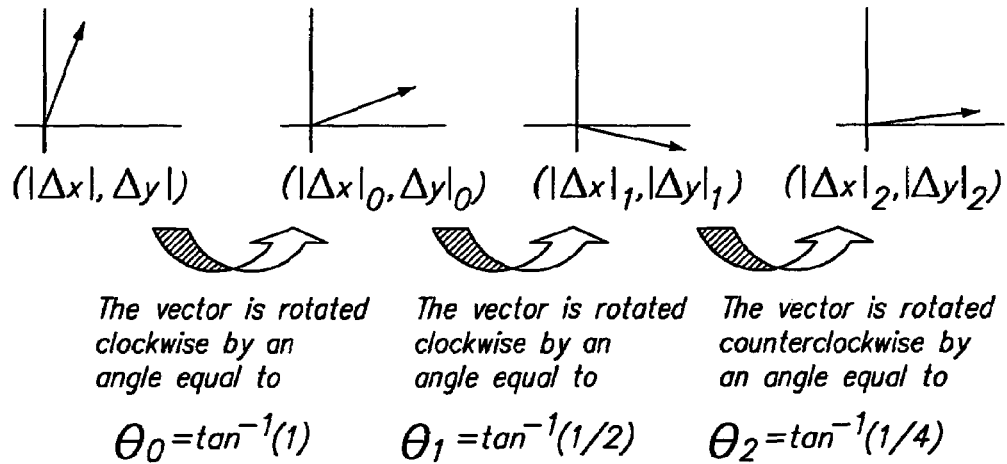
FIG. 30 illustrates a CORDIC (Coordinate Rotation DIgital Computer)-like algorithm for vector quantization.

The second method used to approximate $(\sin(\theta_{xy}), \cos(\theta_{xy}))$ is a CORDIC-like algorithm. This method is similar to the line-comparison method. However, the CORDIC-like algorithm partitions the vector plane more equally. A more detailed description of the algorithm is presented as follows and is illustrated in FIG. 30:

1. First, convert the vector $(\Delta x, \Delta y)$ into the first quadrant $(|\Delta x|, |\Delta y|)$
2. Second, rotate the vector $(|\Delta x|, |\Delta y|)$ clock-wise with an angle $\Theta_0 = \tan^{-1}(1)$. The vector after the angle rotation is denoted as $(|\Delta x|_0, |\Delta y|_0)$.
3. Let i=1.
4. If $|\Delta y|_{i-1}$ is greater than 0, rotate the vector $(|\Delta x|_{i-1}, |\Delta y|_{i-1})$ clockwise with an angle $\Theta_i = \tan^{-1}(2^{-i})$. Otherwise, rotate the vector counter-clockwise with an angle of $\Theta_i$. The vector after the angle rotation is $(|\Delta x|_i, |\Delta y|_i)$.
5. Let i=i+1.
6. Repeat steps 4 and 5 if needed.
7. Assume a total of K vector rotations are performed. This algorithm partitions the first quadrant into 2^k sub-sections. The sign of $|\Delta y|_0, |\Delta y|_1, \ldots, |\Delta y|_{K-1}$ can be used to determine which of the 2^k sub-sections the vector $(|\Delta x|, |\Delta y|)$ belongs to.
8. A table filled with pre-quantized and normalized values is then used to approximate the vector $(|\Delta x|, |\Delta y|)$.
9. If the look-up table gives a vector of $(\sin(\theta_{xy}^i), \cos(\theta_{xy}^i))$ for vector $(|\Delta x|, |\Delta y|)$, then $(\sin(\theta_{xy}), \cos(\theta_{xy}))$ can be approximated by the vector $(\text{sign}(\Delta x)*\sin(\theta_{xy}^i), \text{sign}(\Delta y)*\cos(\theta_{xy}^i))$.

The vector rotation in the CORDIC algorithm is carefully done so that the vector rotation is achieved by arithmetic shifts only. This leads to a very efficient structure. The accuracy of the approximation can be improved by going through more CORDIC iterations. If a total of two vector rotations are performed, the resulting partition of the first quadrant is similar as in the line-comparison method shown in FIG. 29.

The normalization of the expression $\sqrt{\Delta x^2 + \Delta y^2}$ and the efficient algorithms to approximate $(\sin(\theta_{xy}), \cos(\theta_{xy}))$ greatly reduce the computational complexity of the locally minimum method. Using these methods, $\rho_{min}$ may be readily evaluated. If the magnitude minimum $\rho_{min}$ falls below the threshold $\rho_{desired}$, a pulse insertion will be performed based on the hole-blowing algorithm. This leads to the third question:

3. What are the In-Phase and Quadrature Correction Weights if the Magnitude Minimum of the Signal Falls Below the Prescribed Threshold?

Similar techniques can be applied to the calculation of $\sin(\theta)$ and $\cos(\theta)$ by replacing $\Delta x$ with $\Delta x = \rho_{xy} \cos(\theta_{xy})$ and $\Delta y$ with $\Delta y = \rho_{xy} \sin(\theta_{xy})$, as follows:

$$\sin\theta = \frac{\Delta x \, \text{sign}(y1\Delta x - x1\Delta y)}{\sqrt{\Delta x^2 + \Delta y^2}}$$

$$= \frac{\rho_{xy} \cos(\theta_{xy}) \text{sign}(y1\Delta x - x1\Delta y)}{\rho_{xy}\sqrt{\cos^2(\theta_{xy}) + \sin^2(\theta_{xy})}}$$

$$= \cos(\theta_{xy}) \text{sign}(y1\Delta x - x1\Delta y)$$

$$\cos\theta = -\sin(\theta_{xy}) \text{sign}(y1\Delta x - x1\Delta y)$$

With the above simplification, the in-phase and quadrature correction weights, $C_I$ and $C_Q$, can be calculated easily with simple subtraction and multiplication:

$$c_I = (\rho_{desired} - \rho_{min})\cos\theta$$

$$c_Q = (\rho_{desired} - \rho_{min})\sin\theta$$

Summary of the Real Time Hole-Blowing Algorithm

To facilitate real-time implementation, a novel approach is taken to estimate the timings for the low-magnitude events. Also, the locally-minimum method is greatly simplified by normalizing the expression $\sqrt{\Delta x^2 + \Delta y^2}$. As a result, no division, square operation, nor square-root operation are required.

Two methods are being proposed to evaluate $(\sin(\theta_{xy}), \cos(\theta_{xy}))$ given the vector $(\Delta x, \Delta y)$. The first one is the line-comparison method, and the second one is the CORDIC-like algorithm. The implementation complexities of the above two methods are generally low since only arithmetic shifts and comparisons are needed.

APPENDIX I

A1.0 Analysis of the O'Dea Hole-Blowing Methods

In this Appendix, a detailed analysis is presented of the hole-blowing methods proposed in U.S. Pat. Nos. 5,696,794 and 5,805,640. These two patents are very similar and are therefore treated simultaneously. The main difference is that the former patent (U.S. Pat. No. 5,696,794) modifies the symbols to be transmitted, while the latter patent (U.S. Pat. No. 5,805,640) adds pulses at T/2 symbol timing instants. For brevity, patent U.S. Pat. No. 5,696,794 will be referred to as the symbol rate method, and patent U.S. Pat. No. 5,805,640 will be referred to as the T/2 method. An overview of both methods is first presented, followed by an examination of performance with two different signal modulations. The first test signal is $\pi/4$ QPSK with zero-ISI raised cosine pulse shaping. This is the modulation employed in the two patents. The second test signal is a UMTS 3GPP uplink signal with one active DPDCH and a DPDCH/DPCCH amplitude ratio of 7/15. UMTS uses square-root raised-cosine pulse shaping with 0.22 rolloff characteristic.

A1.1 Overview of the O'Dea Hole-Blowing Algorithms

The term "half-symbol timing" is defined to be those time instants that are exactly halfway between symbol times. That is, if the PAM signal is modeled as $$s(t) = \sum_k a_k p(t - kT)$$

where T is the symbol period and p(t) is the pulse shape, then the half-symbol times correspond to t=kT+T/2 where k is an integer. For clarity of presentation, it will be assumed that the maximum value of p(t) has been normalized to unity.

Both methods test for the existence of undesirable low-power events by measuring the signal magnitude at the half-symbol time instants, and comparing this value to some desired minimum magnitude mag_d:

$$mag\_s = |s(kT+T/2)| \overset{?}{\le} mag\_d$$

Figure 31:
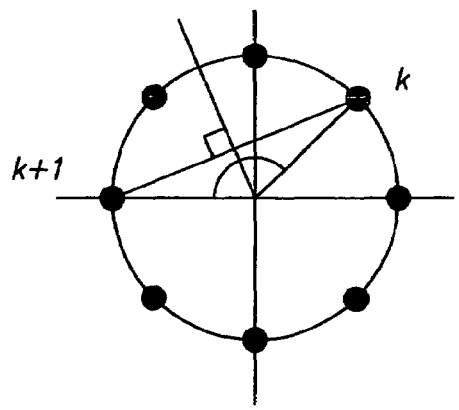
FIG. 31 is an illustration of a known method of calculating the phase of the corrective pulse(s)

Both patents use the same method to calculate the phase of the corrective pulse(s). Assume that the low-magnitude event occurs between symbols k and k+1. First, determine the so-called phase rotation $\theta_{rot}$, which is simply the change in phase in the transition from symbol k to symbol k+1, as illustrated in FIG. 31. The corrective phase $\theta_{adj}$ is given by $$\theta_{adj} = \theta_k + \frac{\theta_{rot}}{2}$$

where $\theta_k$ is the phase of the kth symbol. A vector with phase equal to the adjustment phase is orthogonal to a straight line drawn from symbol k to symbol k+1, as illustrated in FIG. 31. Note that since there are a finite number of possible phase rotations, there are also a finite number of possible phase adjustments, so that explicit calculation of the rotation phase is not necessary.

If the symbol rate approach (U.S. Pat. No. 5,696,794) is used, the two symbols adjoining the low-magnitude event (i.e., symbols k and k+1) are modified by the addition of a complex scalar. The magnitude of this complex scalar is given by $$m=0.5(mag\_d-mag\_s)/p_{mid}$$

where $p_{mid}$ is the amplitude of the pulse shaping filter at t=T/2. (The rationale for calculating the magnitude of the correction in this manner, however, is unclear.) The complex scalar adjustment is then $$c_{adj}=m\exp(j\theta_{adj})$$

and the resulting modified symbols are given by $$\tilde{a}_k=a_k+c_{adj}$$

$$\tilde{a}_{k+1}=a_{k+1}+c_{adj}$$

Note that both symbols are modified in the same manner.

Thus, a noise component is added to the signal by intentional relocation of the information symbols $\{a_k\}$. This can "confuse" any equalizer at the receiver, which will expect that any signal distortion is due to the channel.

If the T/2 approach (U.S. Pat. No. 5,805,640) is used, a complex scalar is added to the symbol stream, before pulse-shaping, at the appropriate half-symbol time instants. When a low magnitude event is detected at t=kT+T/2, a complex symbol with magnitude $$m=(mag\_d-mag\_s)$$

and phase equal to $\theta_{adj}$ (given above) is added at t=kT+T/2. This restriction to T/2 insertion timing limits this method to circular signal constellations.

One additional difference between the symbol rate method and the T/2 method is that the symbol rate method is intended to be applied iteratively until the signal magnitude does not drop below some threshold. There is no mention of an iterative process in the T/2 patent.

A1.2 Performance with π/4 QPSK

Consider now the performance of the known hole-blowing algorithms relative to the disclosed "exact" hole-blowing method when the targeted signal is π/4 QPSK. It is interesting to note that this signal has a "hole" in its constellation if the rolloff is high, e.g., α=0.5. A rolloff of 0.22 was chosen so that the signal would not have a pre-existing hole.

Figure 32:
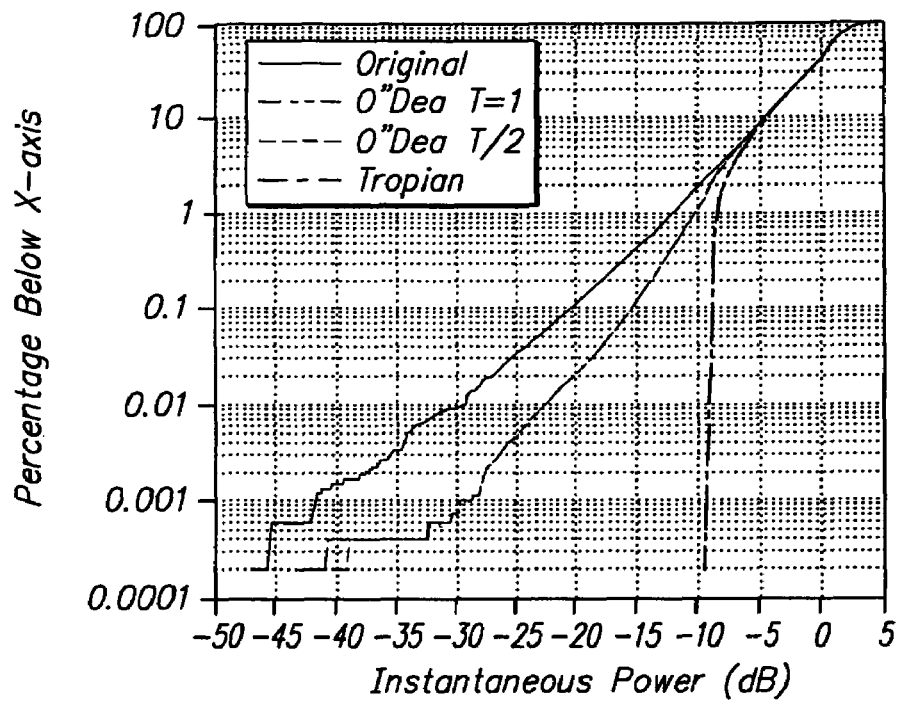
FIG. 32 shows Cumulative Distribution Functions (CDF) obtained with the present method and with known methods when the signal is pi/4 QPSK with raised cosine pulse-shaping and excess bandwidth of 22% (the desired minimum power is 9 dB below RMS)

FIG. 32 shows the CDF obtained from the disclosed method and the two known methods with the aforementioned p/4 QPSK signal. The desired minimum power level was set at 9 dB below RMS. These simulation results are based on 16384 symbols with 32 samples/symbol. The figure clearly shows that the exact method is much more effective than either of the known methods. It is also evident that both known methods perform similarly. This is not surprising given the similarity of the two approaches.

Figure 33:
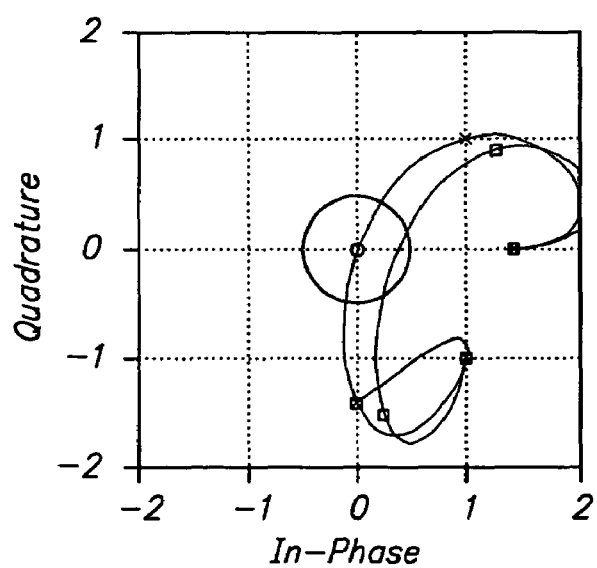
FIG. 33 illustrates an example where the known symbol rate method works fairly well (the original signal envelope is shown, the modified envelope is shown, and the sample used to calculate the correction magnitude is indicated)
Figure 34:
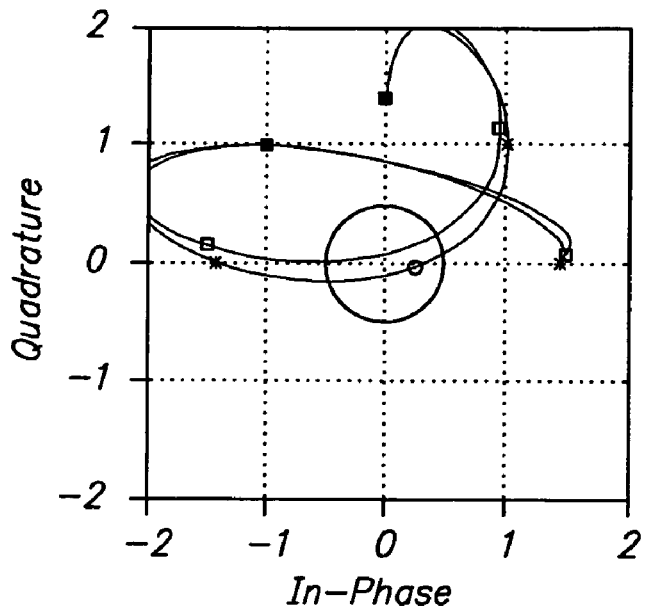
FIG. 34 illustrates an example where the known symbol rate method does not work well.

Some explanation of the performance of the known methods as shown in FIG. 32 is in order. It was noted earlier that there are sources of error possible in calculation of both the magnitude and phase of the correction pulses. FIG. 33 shows an example where the prior-art symbol rate method works fairly well. The signal envelope is not pushed completely out of the desired hole, but the method is performing more-or-less as intended. In contrast, FIG. 34 shows an example where the prior-art symbol rate method does not perform well. This example illustrates error in both the magnitude and phase of the corrective pulses. In this example, the trace passes on the "wrong side" of the origin relative to the assumptions made in calculating the correction phase. Thus the trace is pushed in the wrong direction. Furthermore, it is evident from this example that the magnitude at T/2 is not the minimum magnitude, so that even if the phase had been calculated correctly, the signal would not have been pushed far enough.

Figure 35:
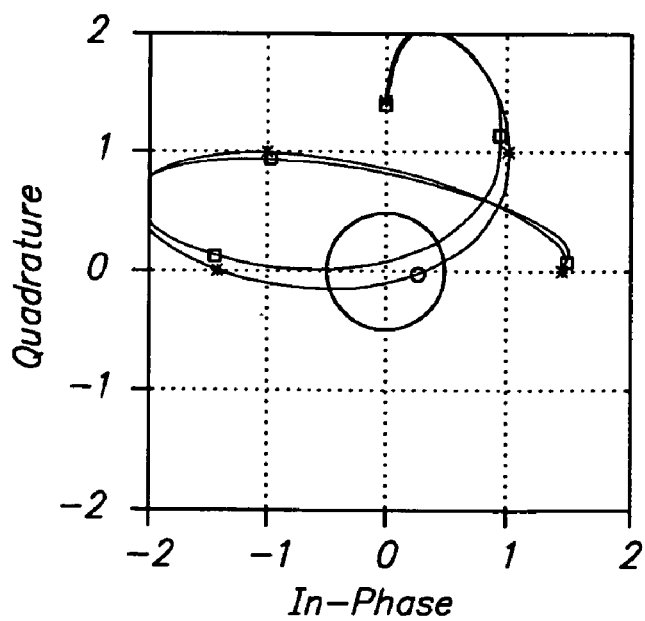
FIG. 35 illustrates an example where the known T/2 method does not work well.

FIG. 35 shows an example where the prior-art T/2 method does not perform well. (The segment shown in FIG. 35 is the same segment of the signal shown in FIG. 34, where the symbol rate method did not perform well.) Comparing FIG. 34 and FIG. 35, it is clear that the two methods yield nearly identical traces. It can be seen that the symbol rate method only alters the symbols adjacent to the low-magnitude event, while the T/2 method affects more symbols.

A1.3 Performance with a 3GPP Uplink Signal

Figure 36:
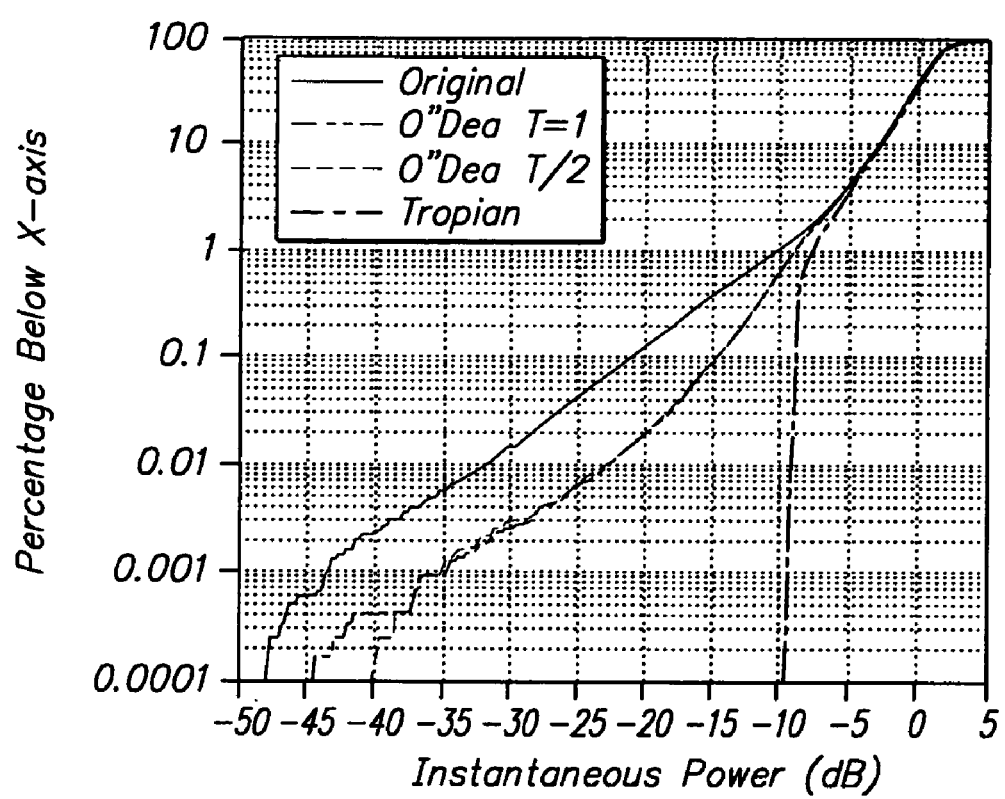
FIG. 36 shows Cumulative Distribution Functions (CDF) obtained with the present method and the two known methods when the signal is a 3GPP uplink signal with one active DPDCH and amplitude ratio of 7/15 (the desired minimum power is 9 dB below RMS).

Consider now the performance of the known methods with a more realistic signal, that being a 3GPP uplink signal with one active DPDCH and an amplitude ratio of 7/15. FIG. 36 shows the CDF's obtained with the disclosed exact method and with the known hole-blowing methods when applied to one frame (38400 chips) of the signal with 32 samples/chip. It is clear that the exact correction method greatly outperforms the known methods, and that the known methods perform comparably.

What is claimed is:

1. A method of reducing the average-to-minimum magnitude ratio (AMR) of a communications signal having a sequence of symbols, comprising:

obtaining a digital message for generating the communications signal having a sequence of symbols;

applying a pulse-shaping technique to an instance of a pulse of a given form to generate a communications signal s(t);

obtaining a minimum value $\rho(t_{min})$ of the magnitude of the generated communication signal s(t) at a time instant t_min in a time interval between two distinct time instants t1 and t2 ($t_1 < t_2$);

generating, in the time interval between the time instants $t_1$ and $t_2$, a correction signal with a predetermined impulse response $r(t-t_{min})$ which is obtained based on the minimum value and the predetermined signal envelope minimum if it is determined that $\rho(t_{min})$ is smaller than a predetermined signal envelope minimum; and adding the correction signal to the communications signal to generate a modified communications signal, wherein the communications signal is represented within a signal plane having an origin denoting a signal of zero magnitude;

the minimum value of the magnitude of the communications signal is calculated from a distance from the origin to a first straight line spanning a coordinate of the communications signal $s(t_1)$ and a coordinate of the communications signal $s(t_2)$, and the method further comprises:

determining the first straight line spanning the coordinate of the communications signal $s(t_1)$ and the coordinate of the communications signal $s(t_2)$ and a second straight line passing through the origin and being orthogonal to the first straight line; and calculating the minimum value $\rho(t_{min})$ of the magnitude of the communications signal from a distance from the origin to an intersection point of the first straight line and the second straight line.

2. The method of claim 1 wherein the correction signal is added to the communications signal at times other than t=kT+T/2, where T denotes the symbol period and k is an integer.

3. The method of claim 1, wherein a correction weight C is determined based on the minimum value and the predetermined signal envelope minimum; and the predetermined impulse response $r(t-t_{min})$ is generated based on the correction weight C.

4. The method of claim 1, wherein the communications signal $s(t_1)$ and the communications signal $s(t_2)$ are generated by using a pulse-shaping filter p(t), and the pulse-shaping filter p(t) and a pulse-shaping filter r(t) having the correction weight C are substantially identical with each other.

5. The method of claim 1, wherein a modified in-phase component, which the modified communications signal has, is translated to an amplitude component and a phase component and a modified quadrature component, which the modified communications signal has, is translated to an amplitude component and a phase component, and the amplitude components and the phase components are polar-modulated.

6. The method of claim 1, wherein the minimum value $\rho(t_{min})$ is generated using a locally-linear model.

7. A PAM generator, comprising:

a baseband modulator for applying a pulse-shaping technique to instance of a pulse of a given form to generate a communications signal;

an analyzer connected to an output end of the baseband modulator for obtaining a minimum value $\rho(t_{min})$ of the magnitude of the communications signal at a time instant $t_{min}$ in a time interval between two distinct time instants $t_1$ and $t_2$ ($t_1 < t_2$);

a pulse-shaping filter connected to an output end of the analyzer for generating, in the time interval between the time instants $t_1$ and $t_2$, a correction signal by multiplying a correction weight C, based on the minimum value $\rho(t_{min})$ and a predetermined signal envelope minimum, by a predetermined impulse response $r(t-t_{min})$, which is based on the time instant $t_{min}$, if it is determined that there exists a time instant t in the time interval between the time instants $t_1$ and $t_2$ where the magnitude of the communications signal at the time instant t is smaller than the predetermined signal envelope minimum; and an adder for adding the correction signal to the communications signal s(t) to generate a modified communications signal, wherein the communications signal is represented within a signal plane having an origin denoting a signal of zero magnitude;

the minimum value $\rho(t_{min})$ of the magnitude of the communications signal is calculated from a distance from the origin to a first straight line spanning a coordinate of the communications signal $s(t_1)$ and a coordinate of the communications signal $s(t_2)$;

the first straight line spanning the coordinate of the communications signal $s(t_1)$ and the coordinate of the communications signal $s(t_2)$, and a second straight line passing through the origin and being orthogonal to the first straight line are determined; and the minimum value $\rho(t_{min})$ of the magnitude of the communications signal from a distance from the origin to an intersection point of the first straight line and the second straight line is calculated.

8. The PAM generator according to claim 7, wherein the communications signal $s(t_1)$ and the communications signal $s(t_2)$ are generated by using a pulse-shaping filter p(t), and the pulse-shaping filter p(t) and a pulse-shaping filter r(t) having the correction weight C are substantially identical with each other.

9. The PAM generator according to claim 7 further comprising a coordinate translation section, wherein the coordinate translation section translates a modified in-phase component of the modified communications signal to an amplitude component and a phase component, translates a modified quadrature component of the modified communications signal to an amplitude component and a phase-component, and polar-modulates the phase components and the phase-components.

* * * * *

UNITED STATES PATENT AND TRADEMARK OFFICE
CERTIFICATE OF CORRECTION

PATENT NO. : 7,675,993 B2 Page 1 of 1
APPLICATION NO. : 11/442488
DATED : March 9, 2010
INVENTOR(S) : Richard W. Booth et al.

It is certified that error appears in the above-identified patent and that said Letters Patent is hereby corrected as shown below:

In Column 30, Line 17 (Claim 7), change "tin" to --t in--.

Signed and Sealed this

Twenty-fifth Day of May, 2010

David J. Kappos
*Director of the United States Patent and Trademark Office*